United States Patent
Canavor et al.

(10) Patent No.: US 10,387,825 B1
(45) Date of Patent: Aug. 20, 2019

(54) DELIVERY ASSISTANCE USING UNMANNED VEHICLES

(71) Applicant: Amazon Technologies, Inc., Seattle, WA (US)

(72) Inventors: Darren Ernest Canavor, Redmond, WA (US); Jon Arron McClintock, Seattle, WA (US); Brandon William Porter, Yarrow Point, WA (US)

(73) Assignee: Amazon Technologies, Inc., Seattle, WA (US)

( * ) Notice: Subject to any disclaimer, the term of this patent is extended or adjusted under 35 U.S.C. 154(b) by 613 days.

(21) Appl. No.: 14/745,193

(22) Filed: Jun. 19, 2015

(51) Int. Cl.
G06Q 10/08 (2012.01)
H04W 12/06 (2009.01)
H04W 4/02 (2018.01)
H04W 76/10 (2018.01)
H04W 84/12 (2009.01)

(52) U.S. Cl.
CPC ..... G06Q 10/08355 (2013.01); G06Q 10/083 (2013.01); H04W 4/02 (2013.01); H04W 12/06 (2013.01); H04W 76/10 (2018.02); H04W 84/12 (2013.01)

(58) Field of Classification Search
CPC ............ G08G 5/0069; B64C 2201/128; G06Q 10/083; G06Q 10/08355
USPC .................................................. 705/338, 330
See application file for complete search history.

(56) References Cited

U.S. PATENT DOCUMENTS

2013/0240673 A1* 9/2013 Schlosser ............... G05D 1/101
244/137.1

2016/0068264 A1* 3/2016 Ganesh ................ G08G 5/0069
701/2

OTHER PUBLICATIONS

Phantom 2 Vision. User Manual V1.8. Jan. 2015 Revision. 71 pages.*
International Organization for Standardization/ International Electrotechnical Commission, "Information technology—Trusted Platform Module—Part 1: Overview," International Standard, ISO/IEC 11889-1(E), May 15, 2009, 20 pages.
International Organization for Standardization/International Electrotechnical Commission, "Information technology—Trusted Platform Module—Part 2: Design principles," International Standard, ISO/IEC 11889-2(E), May 15, 2009, 152 pages.
International Organization for Standardization/International Electrotechnical Commission, "Information technology—Trusted Platform Module—Part 3: Structures," International Standard, ISO/IEC 11889-3:2009(E), 204 pages.
International Organization for Standardization/International Electrotechnical Commission, "Information technology—Trusted Platform Module—Part 4: Commands," International Standard, ISO/IEC 11889-4:2009(E), 254 pages.

(Continued)

*Primary Examiner* — Florian M Zeender
*Assistant Examiner* — Christopher R Buchanan
(74) *Attorney, Agent, or Firm* — Davis Wright Tremaine LLP

(57) ABSTRACT

An unmanned vehicle obtains first location information associated with a customer order, which causes the unmanned vehicle to travel to a first location. While at the first location, the unmanned vehicle receives, from another device, second location information. The unmanned vehicle uses the second location information to travel to a second location where the other device is located. Once at the second location, the unmanned vehicle performs one or more operations involved with fulfillment of the order.

16 Claims, 11 Drawing Sheets

(56) References Cited

OTHER PUBLICATIONS

Trusted Computing Group, "TPM Main, Part 1 Design Principles," Specification Version 1.2, Level 2 Revision 103, Jul. 9, 2007, 182 pages.
Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 1.2, Level 2 Revision 103, Jul. 9, 2007, 198 pages.
Trusted Computing Group, "TPM Main, Part 2 TPM Structures," Specification Version 1.2, Revision 116, Mar. 1, 2011, 201 pages.
Trusted Computing Group, "TPM Main, Part 3 Commands," Specification Version 1.2, Level 2 Revision 103, Jul. 9, 2007, 330 pages.
Trusted Computing Group, "TPM Main, Part 3 Commands," Specification Version 1.2, Revision 116, Mar. 1, 2011, 339 pages.

\* cited by examiner

DELIVERY ASSISTANCE USING UNMANNED VEHICLES

BACKGROUND

The growth of computer-implemented services has enabled functionality and features that were previously not possible. For example, various computer systems have been developed that provide electronic commerce services which have enabled new ways of conducting business, from new ways for ordering and receiving goods, to new ways of obtaining services. Despite all of the advantages the development of computer-implemented services has enabled, many issues remain. For example, if a customer is in a remote location with limited network connectivity or the customer location is not known with some certainty, it may be difficult to deliver items to the customer. As another example, many techniques that have been developed are still susceptible to item theft, item loss or other malicious action if the intended customer is not present during a delivery. This may cause some service providers to limit or refuse delivery of items to customers in remote locations or where the risk of item loss is great.

BRIEF DESCRIPTION OF THE DRAWINGS

Various embodiments in accordance with the present disclosure will be described with reference to the drawings, in which.

DETAILED DESCRIPTION

Figure 1:
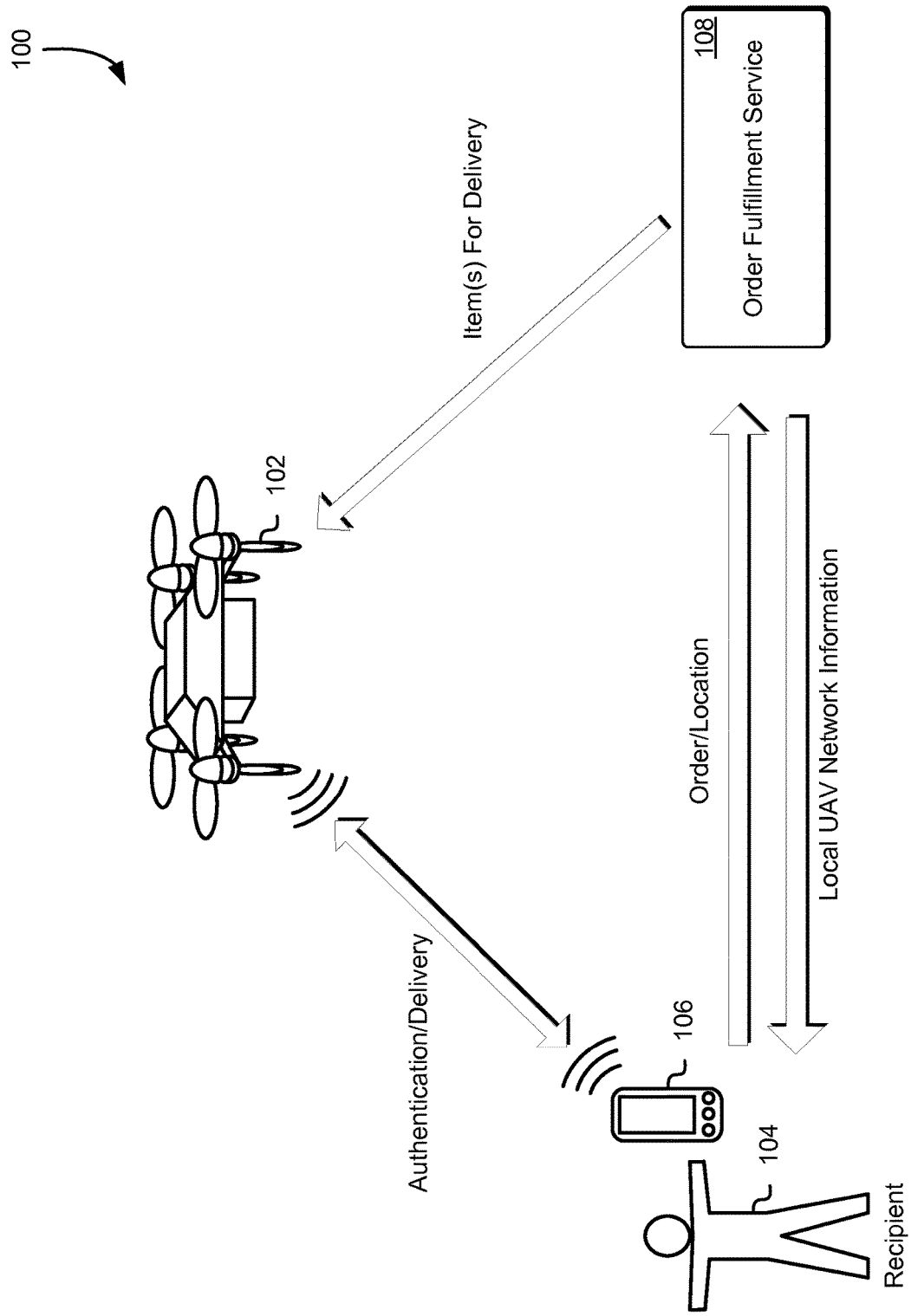
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the delivery of items to customers in remote locations using unmanned vehicles, commonly referred to as "drones," to determine the precise location of these customers and to authenticate the customers prior to delivery of the ordered items. The unmanned vehicles may be part of a system that performs various services, such as parcel delivery and/or pickup, although other roles for unmanned vehicles are within the scope of the present disclosure. In an embodiment, unmanned vehicles are configured to perform various operations to identify the location of a customer in a remote location and to authenticate the customer upon arriving at the customer's location before performing delivery of an item or receiving an item for delivery from the customer.

In an embodiment, a customer of a delivery service or other order fulfillment service submits a request to have an item delivered to the customer's location. The request may be provided to the service through the customer's mobile device or other computing device. For instance, if the customer is in a location with limited network connectivity, the customer may still be able to utilize its mobile device to transmit a request, through a low-bandwidth network connection, to the delivery service to have one or more items to the customer's location. The request may specify the estimated location where the customer will be at the time of delivery, as well as other information usable to identify and authenticate the customer when the delivery of the item is being made. For instance, in order to ensure that the intended customer receives the item to be delivered, the customer may provide a photographic image of the customer, other biometric information (e.g., fingerprint, retinal scan, etc.), or credential information (e.g., username/password, cryptographic key, etc.) to the delivery service. In response to the request, the delivery service may transmit a local network service set identifier (SSID) for a network that is to be established by the unmanned vehicle upon reaching the customer's estimated location. The customer may be instructed to join this local network when the unmanned vehicle is in the customer's vicinity in order to enable delivery of the item.

Once the customer has provided the authentication information necessary for the unmanned vehicle to identify and authenticate the customer at the customer's location, the delivery service may load the unmanned vehicle with the item to be delivered. Additionally, the delivery service may configure the unmanned vehicle to travel to the estimated customer location, as indicated by the customer in the request. The delivery service may further configure the unmanned vehicle to generate a local communications network with the same SSID provided to the customer by the delivery service in response to the customer's request. For instance, when the unmanned vehicle arrives at the estimated customer location, the unmanned vehicle may initiate a local communications network that may be accessible through one or more wireless protocols (e.g., Wi-Fi, etc.). This enables the customer to utilize its mobile device or other computing device to detect the presence of the local communications network. If the customer determines that the SSID of this local communications network is the same SSID provided to the customer by the delivery service, the customer may utilize its mobile device or other computing device to request access to this local communications network.

In an embodiment, once the customer has joined the local communications network established by the unmanned vehicle, the customer can transmit, through its mobile device or other computing device, location information that can be used by the unmanned vehicle to identify the precise location of the customer. As used herein, the term "precise location" shall refer to a location that is sufficiently precise enough for the unmanned vehicle to locate the specific customer, mobile device, or other computing device located at the "precise location." In contrast, an estimated location shall be refer to a location that is sufficiently precise enough for the unmanned vehicle to through which the unmanned vehicle may locate the general vicinity surrounding the specific customer, mobile device, or other computing device. Thus, as described in one or more embodiments herein, an unmanned aerial vehicle may receive an estimated location to reach an area proximate to the customer or device, and then use the precise location to reach the actual customer or device.

For example, through the local communications network, the customer may transmit global positioning system (GPS) coordinates to the unmanned vehicle, which the unmanned vehicle may use to travel to the customer location. In some embodiments, if the customer is unable to provide GPS coordinates for its location, the unmanned vehicle can utilize the customer's signal to the unmanned vehicle to determine a precise location for the customer. For instance, if the delivery service determines that the estimated location where the customer is to be located has limited GPS visibility, the delivery service may dispatch additional unmanned vehicles capable of calculating triangulation data based on the customer's signal to the unmanned vehicles to collectively determine the precise location of the customer. Each of these unmanned vehicles may be wirelessly connected to the local communications network established by any of the unmanned vehicles of the fleet of unmanned vehicles. Alternatively, the unmanned vehicle may use the customer's signal at different locations to triangulate the location of the customer.

Once the unmanned vehicle has determined the location of the customer, the unmanned vehicle may travel to the location to initiate delivery of the item ordered by the customer. When the unmanned vehicle reaches the customer location, the unmanned vehicle may obtain data from the customer usable to authenticate the customer and deliver the item. For instance, the unmanned vehicle may utilize a peripheral device (e.g., camera) to obtain a photographic image of the customer. The unmanned vehicle may utilize facial recognition techniques to determine whether the photographic image of the customer matches the customer image provided to the delivery service as part of the request to have the item delivered to the customer. Additionally, or alternatively, the customer may be required to provide credential information or other biometric information to the unmanned vehicle, which the unmanned vehicle may compare to the authentication information provided by the delivery service to determine whether the customer can be authenticated. If the unmanned vehicle is able to successfully authenticate the customer, the unmanned vehicle may deliver the ordered item to the customer at the customer's location.

In this manner, a delivery service may utilize a fleet of unmanned vehicles to deliver items to a customer in a variety of different locations, while ensuring that the items are delivered only to the customer and no other entity. In addition, the techniques described and suggested herein facilitate additional technical advantages. For example, because, in some embodiments, the unmanned vehicle is configured to locate a customer based at least in part on location data transmitted to the unmanned vehicle from the customer's mobile device or other computing device, the unmanned vehicle may be utilized to also retrieve items from the customer at the customer's location. This enables the customer to utilize the unmanned vehicle for delivering items to another location or to another customer, enabling the customer to act as a seller operating through the delivery service. Further, the unmanned vehicle may be utilized to provide high-bandwidth digital content to the customer through the local communications network at the customer location, even if the customer has limited network connectivity to other communications networks, such as the Internet.

FIG. 1 shows an illustrative example of an environment 100 in which various embodiments can be implemented. In the environment 100, a customer 104 (e.g., recipient) may transmit a request to an order fulfillment service 108 to request delivery of one or more items. The order fulfillment service 108 may include an online marketplace, online retailer, or other commercial enterprise accessible through one or more communications networks, such as the Internet. In order for the customer 104 to transmit its request to the order fulfillment service 108, the customer 104 may utilize a mobile device 106 connected to the one or more communications networks to access the order fulfillment service 108 and provide the parameters of the request. For instance, the request may specify the one or more items to be delivered, the quantity for each item to be delivered, and the like. The mobile device 106 may include a mobile telephonic device, a tablet computer, a laptop computer, smartwatch, smartphone, and any other device capable of accessing the one or more communications networks.

In order for the customer 104 to access the order fulfillment service 108 and/or transmit the request to the service 108 for the one or more items, the customer 104 may be required to provide credential information that may be used by the order fulfillment service 108 to authenticate the customer 104 and to determine whether to fulfill the customer's request to have the one or more items delivered to the customer's location. The credential information may include, among other things, a username, a corresponding password, biometric information, a cryptographic key, a unique identifier, a set of credentials, a hash of the set of credentials, a digital signature generated using a credential, a message authentication code generated based at least in part on a credential, and the like. Additionally, the customer 104 may be required to provide an estimated location where the customer 104 will be in order to receive the one or more items from the order fulfillment service 108. For instance, through its mobile device 106, the customer 104 may provide GPS coordinates of where the customer 104 may be at the time of delivery of the one or more items. Alternatively, the order fulfillment service 108 may transmit a request to the customer's mobile device 106 to obtain travel information (e.g., itinerary including upcoming customer locations, etc.). The estimated location may include the aforementioned GPS coordinates, landmarks, specific terrain features (e.g., named lakes, rivers, mountains, valleys, etc.), distances from known landmarks or specific terrain features, and the like.

Once the order fulfillment service 108 has obtained the customer's current location and the estimated location where the customer 104 will be located at the time of delivery, the order fulfillment service 108 may provide the customer 104, through the mobile device 106, with information usable to access a local communications network that is to be provided through one or more unmanned vehicles 102. For instance, the order fulfillment service 108 may provide the customer 104 with an SSID for the local communications network that is to be provided through the one or more unmanned vehicles 102, where an unmanned vehicle is a vehicle that is able to travel to a specified destination autonomously (e.g., without human intervention after dispatch). Alternatively, the information usable to access the local communications network may include one or more cryptographic keys of cryptographic key pairs, which may be provided to the unmanned vehicle 102 in order to access the network. In an embodiment, the order fulfillment service 108 can provide the information usable to access the local communications network to an application installed on the mobile device, which may configure the mobile device to automatically join the local communications network once the network becomes available. Unmanned vehicles do not necessarily fly and include, but are not limited to, land-based vehicles (e.g., cars, trucks, and other automobiles), rail-based vehicles (e.g., trains), aqueous vehicles (e.g., boats and submarines), different types of air vehicles (helicopters, airplanes, and the like), and/or other types of vehicles. Note that unmanned vehicles, in some implementations, may have a human operator for at least some operation and/or for overriding of automated systems. For instance, a passenger vehicle may be considered an unmanned vehicle even though a passenger may be able to override automated controls. The local communications network, as will be described in greater detail below, enables these one or more unmanned vehicles 102 to better determine the customer's precise location in order to ensure proper delivery of the one or more items.

In an embodiment, the order fulfillment service 108 will transmit a request to the customer 104, through the mobile device 106, to provide additional authentication information that may be used by the one or more unmanned vehicles 102 to identify the customer 104 upon arriving at the customer's location. For instance, in order to fulfill this request, the customer 104 may be required to provide a photographic image of the customer 104 or other recipient of the item. For example, a customer 104 may utilize the camera of its mobile device 106 to capture an image of the customer 104 or the intended recipient. Subsequently, the mobile device 106 may transmit this image to the order fulfillment service 108, which may utilize the image for facial recognition analyses using the customer's or other recipient's facial features (e.g., hair color, eye color, facial geometry, etc.). Additionally, or alternatively, the customer 104 may be required to provide an image of its driver's license or other identification device that may be used to identify the customer 104 and ensure that the customer 104 is authorized to receive the one or more items. For instance, if the one or more items are subject to legal restrictions (e.g., age restrictions for alcohol, tobacco, firearms, etc.), the customer 104 may be required to prove that it is authorized to obtain these one or more items by initially providing a form of identification to the order fulfillment service 108 prior to delivery of the one or more items.

The order fulfillment service 108, upon obtaining the authentication information from the customer 104 and providing the information usable to access the local communications network to be utilized to establish a connection between the one or more unmanned vehicles 102 and the customer's mobile device 106, the order fulfillment service 108 may configure the one or more unmanned vehicles 102 to launch the local communications network using an SSID. Further, the order fulfillment service 108 may configure the one or more unmanned vehicles to travel to the location specified by the customer 104 in the request to the service 108. The one or more unmanned vehicles 102 may also be provided with the expected authentication information that is to be obtained from the customer 104 upon arriving at the customer's location in order to determine whether the delivery of the one or more items are to be delivered. For instance, if the customer 104 provided a photographic image of the customer 104 or other intended recipient, the unmanned vehicle 102 may be configured to obtain a photographic image of the customer 104 or other intended recipient upon arriving at the location in order to identify the intended recipient and ensure delivery is made to the correct recipient.

In some embodiments, the order fulfillment service 108 provides the one or more items to a courier who will make the delivery to the customer 104 or other intended recipient. If a courier is dispatched, the order fulfillment service 108 may configure the one or more unmanned vehicles 102 to communicate with the courier to ensure that the courier is provided with up-to-date location information for the customer 104 or intended recipient as it is received. For instance, once the one or more unmanned vehicles 102 identify the customer's or intended recipient's precise location through the local communications network established by the one or more unmanned vehicles 102, the one or more unmanned vehicles 102 may transmit this location to the courier through the courier's own mobile device. This enables the courier to reach the customer's or other intended recipient's location to deliver the one or more items.

In an embodiment, the order fulfillment service 108 evaluates the coordinates of the location specified by the customer 104 or other location information to determine whether location triangulation is required to identify the customer's or other intended recipient's precise location for delivery. For instance, if the order fulfillment service 108 determines that it may be difficult to obtain GPS coordinates or other location information from the customer 104 or intended recipient at the location provided by the customer 104, the order fulfillment service 108 may dispatch additional unmanned vehicles 102 to enable location triangulation and identify the precise location of the customer 104 and/or intended recipient. For instance, when the customer 104 or other intended recipient accesses the local communications network established by the unmanned vehicles 102, each unmanned vehicle 102 may generate triangulation data based at least in part on the signal from the customer's or other intended recipient's mobile device. This triangulation data may be shared with the other unmanned vehicles 102, enabling each unmanned vehicle to calculate the precise location for the customer or intended recipient. This location information may be used by the unmanned vehicle carrying the one or more items to travel to the precise location for delivery of the one or more items. Alternatively, if a courier has been dispatched to deliver the one or more items, any of the unmanned vehicles 102 may provide this location information to the courier.

In an alternative embodiment, if triangulation is required to determine a precise location for the customer 104 or other intended recipient, the unmanned vehicle 102 can utilize the signal from the customer's mobile device to determine triangulation data for calculation of a precise location for the customer 104. For instance, the unmanned vehicle 102, upon arriving at the estimated customer location, may obtain a signal from the customer's mobile device. Subsequently, the unmanned vehicle 102 may travel to other locations to record the signal from the customer's mobile device. At each location, the unmanned vehicle 102 may determine its own location, the signal strength, and other information that may be used to generate triangulation data for the location. The unmanned vehicle 102 may use this triangulation data to calculate the precise customer location for delivery of the one or more items.

It should be noted that the precise location for the customer or intended recipient may be obtained based at least in part on more detailed location information obtained from the customer 104 or other intended recipient through its mobile device 106. For instance, if the customer 104 has specified the estimated location where the customer 104 or other intended recipient is located using GPS coordinates, the customer 104 or other intended recipient may provide updated GPS coordinates to specify the precise location where the customer 104 or other intended recipient is located once the one or more unmanned vehicles 102 arrive at the estimated location. Alternatively, if the customer 104 has specified an estimated location based at least in part on a landmark or other named terrain feature, the customer 104 or other intended recipient may provide a precise location utilizing any combination of GPS coordinates, distance from the originally specified landmark or other named terrain feature using finer granularity (e.g., meters/feet distance measurements over kilometers/miles measurements, etc.), and the like. If triangulation data is utilized to calculate the precise location of the customer 104 or other intended recipient, the one or more unmanned vehicles 102 may utilize fine grain distance measurements from its present location to the calculated location of the customer 104 or other intended recipient. For instance, the one or more unmanned vehicles 102 may calculate distances utilizing Cartesian coordinates (e.g., X, Y, Z coordinates) from their present location.

Once the one or more unmanned vehicles 102 have arrived at the location specified by the customer 104 through the request to the order fulfillment service 108, the one or more unmanned vehicles 102 may initiate a broadcast of the local communications network. Additionally, the one or more unmanned vehicles 102 may transmit a notification to the order fulfillment service 108 indicating that the one or more unmanned vehicles 102 have arrived at the specified location. This enables the service 108 to transmit a notification to the customer's or other intended recipient's mobile device 106 to indicate that the customer or intended recipient may now attempt to connect to the local communications network using the provided network information. This enables the customer 104 or other intended recipient to utilize the mobile device 106 to detect the local communications network and to connect to the local communications network. In some embodiments, the customer 104 or other intended recipient will be required to provide credential information in order to establish a connection with the local communications network established by the one or more unmanned vehicles 102. Alternatively, if the customer 104 provides one or more cryptographic keys to an unmanned vehicle 102, the unmanned vehicle 102 may evaluate the provided cryptographic keys to determine whether the customer 104 is authorized to access the network.

The one or more unmanned vehicles 102, upon detecting that the mobile device 106 has been used to connect to the local communications network, may transmit a request to the mobile device 106 to obtain the current location of the customer or intended recipient. The mobile device 106, in response to this request, may provide the GPS coordinates where the customer or intended recipient is located. Alternatively, as noted above, if the mobile device 106 is unable to provide GPS coordinates or other location data, the one or more unmanned vehicles 102 may utilize signal triangulation to estimate the location of the customer or other intended recipient using the mobile device 106. Once the one or more unmanned vehicles have obtained the customer's or other intended recipient's location from the mobile device 106, the unmanned vehicle 102 carrying the one or more items for delivery may travel to this location to deliver the one or more items. Alternatively, if a courier is to make the delivery, the one or more unmanned vehicles 102 may transmit this location information to the courier, which enables the courier to travel to the location to make the delivery.

In an embodiment, the one or more unmanned vehicles 102 are configured to utilize the provided location information from the mobile device 106 to determine whether delivery of the one or more items may be performed at the customer's or other intended recipient's location. For instance, if the customer 104 or other intended recipient is located in a location that may be inaccessible for an unmanned vehicle 102 or courier, the one or more unmanned vehicles 102 may identify a nearby location where delivery may be performed. The one or more unmanned vehicles 102 may transmit a notification to the customer 104 or other intended recipient specifying this nearby location (e.g., GPS coordinates, compass headings and distance, etc.) such that the customer 104 or other intended recipient may travel to this nearby location to ensure delivery of the one or more items. The one or more unmanned vehicles 102 may further indicate that the location specified by the mobile device 106 is inaccessible if the one or more items are subject to one or more restrictions preventing delivery of the one or more items at the specified location. Thus, the one or more unmanned vehicles 102 may specify a delivery location that is not subject to these restrictions.

Prior to delivering the one or more items to the customer 104 or other intended recipient, the one or more unmanned vehicles 102 may utilize the authentication information provided by the order fulfillment service 108 to identify and authenticate the customer 104 or other intended recipient prior to completing deliver of the one or more items. For instance, if the customer 104 provided one or more photographic images of the customer 104 or other intended recipient to the order fulfillment service 108, the one or more unmanned vehicles 102 may utilize these images, as well as one or more facial recognition analyses to identify the customer 104 or other intended recipient. The one or more unmanned vehicles 102 may utilize a camera installed on the one or more unmanned vehicles 102 to capture images of the customer 104 or other intended recipient at the location and use the one or more facial recognition analyses to determine whether the individual represented in the captured images matches the individual represented in the images provided to the order fulfillment service 108. If so, the one or more unmanned vehicles 102 may determine that the person at the location is the customer 104 or other intended recipient.

In some embodiments, when the one or more unmanned vehicles 102 arrive at the location, the one or more unmanned vehicles 102 will prompt the customer 104 or other intended recipient to provide authentication information usable by the one or more unmanned vehicles 102 to authenticate the customer 104 or other intended recipient. For instance, the customer 104 or other intended recipient may be required to provide credential information to the one or more unmanned vehicles 102 prior to delivery completion. This credential information may be identical to the information provided to the order fulfillment service 108 or alternative credential information provided by the order fulfillment service 108 to the customer 104 or other intended recipient upon acknowledgment of receipt of the order for delivery of the one or more items. If the one or more unmanned vehicles 102 are able to authenticate the customer 104 or other intended recipient at the location, the one or more unmanned vehicles 102 may provide the one or more items to the customer 104 or other intended recipient, completing the order. The one or more unmanned vehicles 102 may then return to the order fulfillment service 108 or other dispatch center to await further instructions.

Figure 2:
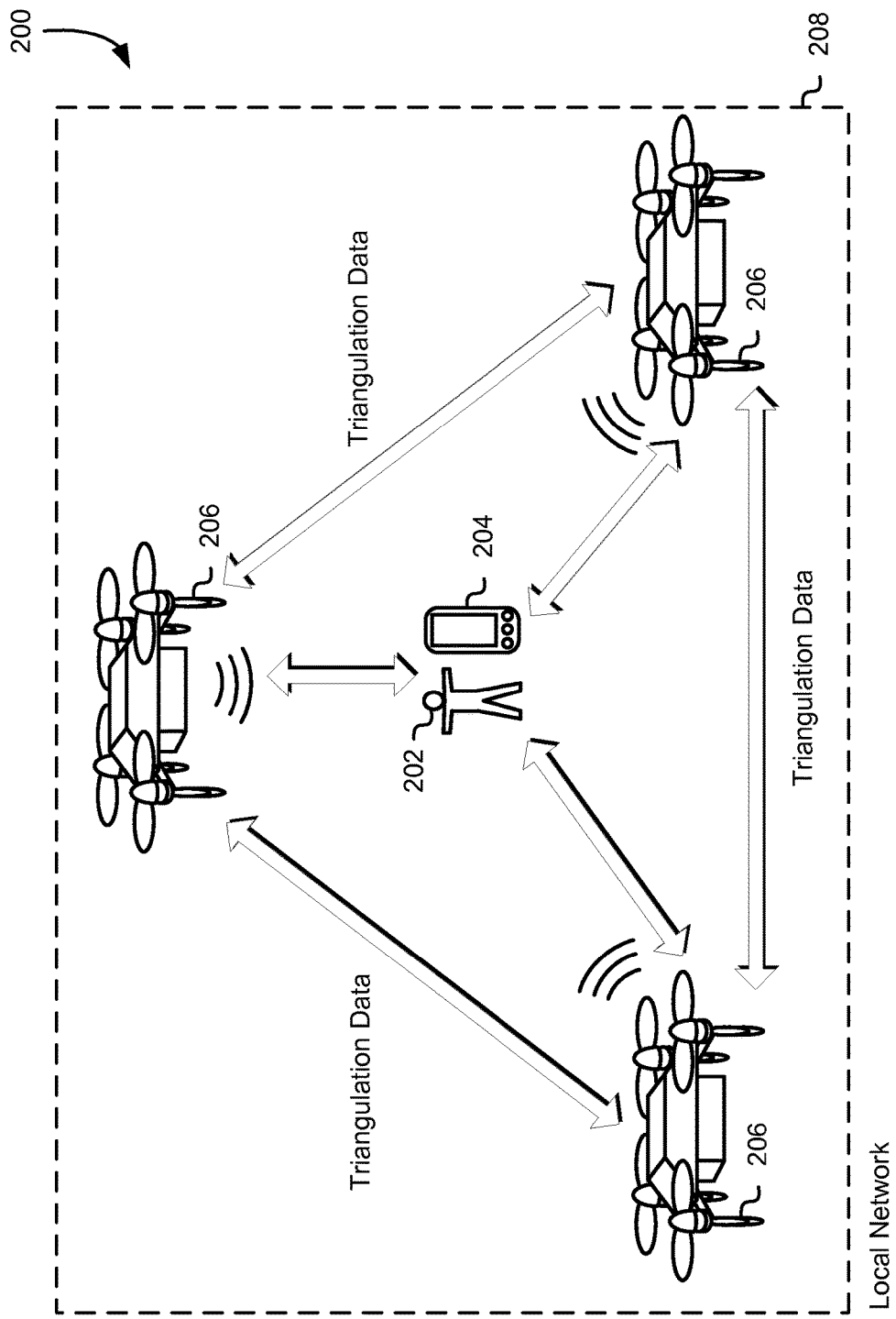
FIG. 2 shows an illustrative example of an environment in which one or more unmanned vehicles are utilized to enable a customer to access a local network for providing location information usable to determine the location of the customer in accordance with at least one embodiment.

As noted above, one or more unmanned vehicles, upon arriving at the location specified by the customer through the request to the order fulfillment service, may establish a local communications network to enable the customer or other intended recipient to access the network and provide location information to the one or more unmanned vehicles. In some embodiments, the order fulfillment service may launch additional unmanned vehicles to the location specified by the customer if the order fulfillment service determines that the customer or other intended recipient may be unable to provide accurate location information that can be used by the unmanned vehicles to locate the customer or other intended recipient. This enables the unmanned vehicles to utilize triangulation to calculate the customer's or other intended recipient's location. Accordingly, FIG. 2 shows an illustrative example of an environment 200 in which one or more unmanned vehicles 206 are utilized to enable a customer 202 to access a local network 208 for providing location information usable to determine the location of the customer 202 in accordance with at least one embodiment.

In the environment 200, one or more unmanned vehicles 206 have established a local communications network 208 that may be used to enable the customer 202 to provide, through a mobile device 204, location information usable by the one or more unmanned vehicles 206 to determine a more accurate location for the customer 202 or other intended recipient. As noted above, the customer 202 or other intended recipient may be provided with information usable to access the local communications network 208 when the customer 202 submits an order to the order fulfillment service for delivery of one or more items. When the one or more unmanned vehicles 206 establish the local communications network 208 at the location specified by the customer 202, the one or more unmanned vehicles 206 may additionally broadcast the SSID of the local communications network 208. This SSID may be included in the information provided to the customer 202 or other intended recipient upon acknowledgment of the customer's order for the one or more items. Alternatively, the information provided to the customer's device may cause an application installed on the customer's mobile device to automatically configure the mobile device to access the local communications network 208 upon detection.

The customer 202 or other intended recipient, upon detecting the local communications network 208, may utilize a mobile device 204 to wirelessly connect to the local communications network 208. In some embodiments, the customer 202 or other intended recipient may be required to provide credential information in order to access this local communications network 208. For instance, in order to access the local communications network 208, the one or more unmanned vehicles 206 may cause the mobile device 204 to prompt the customer 202 or other intended recipient to provide credential information to the one or more unmanned vehicles 206. The one or more unmanned vehicles 206 may utilize this provided credential information to determine whether the customer or other intended recipient is authorized to access the local communications network 208. If the customer 202 or other intended recipient successfully connects to the local communications network 208 using the mobile device 204, the one or more unmanned vehicles 206 may transmit a request to the mobile device 204 to obtain the location of the customer 202 or other intended recipient.

In response to the request from the one or more unmanned vehicles 206, the mobile device 204 may transmit GPS coordinates or other information (e.g., cell identification, Forward Link Timing, etc.) that may be used by the one or more unmanned vehicles 206 to identify the location of the mobile device 204 and, hence, the location of the customer 202 or other intended recipient. In some embodiments, if the order fulfillment service determines that utilizing GPS or other common location identification methods are not feasible at the location specified by the customer 202, the order fulfillment service can deploy a number of unmanned vehicles 206 capable of using network triangulation to determine the location of the customer 202 or other intended recipient upon arriving at the location specified by the customer 202. In an alternative embodiment, an unmanned vehicle 206 can include a number of other unmanned vehicles that may be deployed from the unmanned vehicle 206 to assist in determining the location of a customer 202 or other intended recipient. For instance, when the one or more unmanned vehicles 206 arrive at the location specified by the customer, and the customer 202 or other intended recipient utilizes the mobile device 204 to access the local communications network 208, each unmanned vehicle 206 may determine the signal strength and time required to obtain data from the mobile device 204 (e.g., ping test response, etc.). This information may be transmitted to the other unmanned vehicles 206 at the location. Additionally, each unmanned vehicle 206 may obtain this information obtained from other unmanned vehicles 206 at the location. Each unmanned vehicle 206 may subsequently utilize the information obtained by the unmanned vehicles 206 at the location to calculate a precise location where the mobile device 204 is located. In an alternative embodiment, a single unmanned vehicle 206 obtains this information at different locations around the estimated location provided by the customer 202. For instance, the unmanned vehicle 206 may determine the signal strength and time required to obtain data at each of these locations. The unmanned vehicle 206 may utilize this set of information to triangulate the precise location of the customer 202. It should be noted that any number of unmanned vehicles 206 may be used to perform network triangulation to determine the location of the customer 202.

Once the one or more unmanned vehicles 206 have determined the location of the customer 202 or other intended recipient based at least in part on the signal from the mobile device 204, one or more unmanned vehicles carrying the one or more items to be delivered may be dispatched to the determined location. For instance, one or more unmanned vehicles 206 at the location specified by the customer 202 may also include the one or more items to be delivered. Alternatively, if the one or more items are not carried by any of the unmanned vehicles 206 at the location, the one or more unmanned vehicles 206 may transmit the calculated location to the order fulfillment service, which may subsequently dispatch a courier or other unmanned vehicle to the calculated location to complete delivery of the one or more items ordered by the customer 202. In yet another embodiment, if a courier was dispatched along with the one or more unmanned vehicles 206 upon receipt of the customer's 202 order, the one or more unmanned vehicles 206 may transmit the calculated location to the courier en-route to the customer 202 or other intended recipient.

In an embodiment, based at least in part on the calculated location of the customer 202 or other intended recipient, the one or more unmanned vehicles 206 will determine whether delivery of the one or more items may be performed at the calculated location. For instance, if the calculated location is inaccessible to unmanned vehicles and/or couriers, the one or more unmanned vehicles 206 may determine an alternative location where delivery of the one or more items may be completed. For instance, if the calculated location is in a body of water, the one or more unmanned vehicles 206 may identify a location on the shores of the body of water that is in close proximity to the customer's or other intended recipient's present location. The one or more unmanned vehicles 206 may transmit this desired location to the mobile device 204, which may instruct the customer 202 or other intended recipient to travel to this location to ensure successful delivery of the one or more items.

Figure 3:
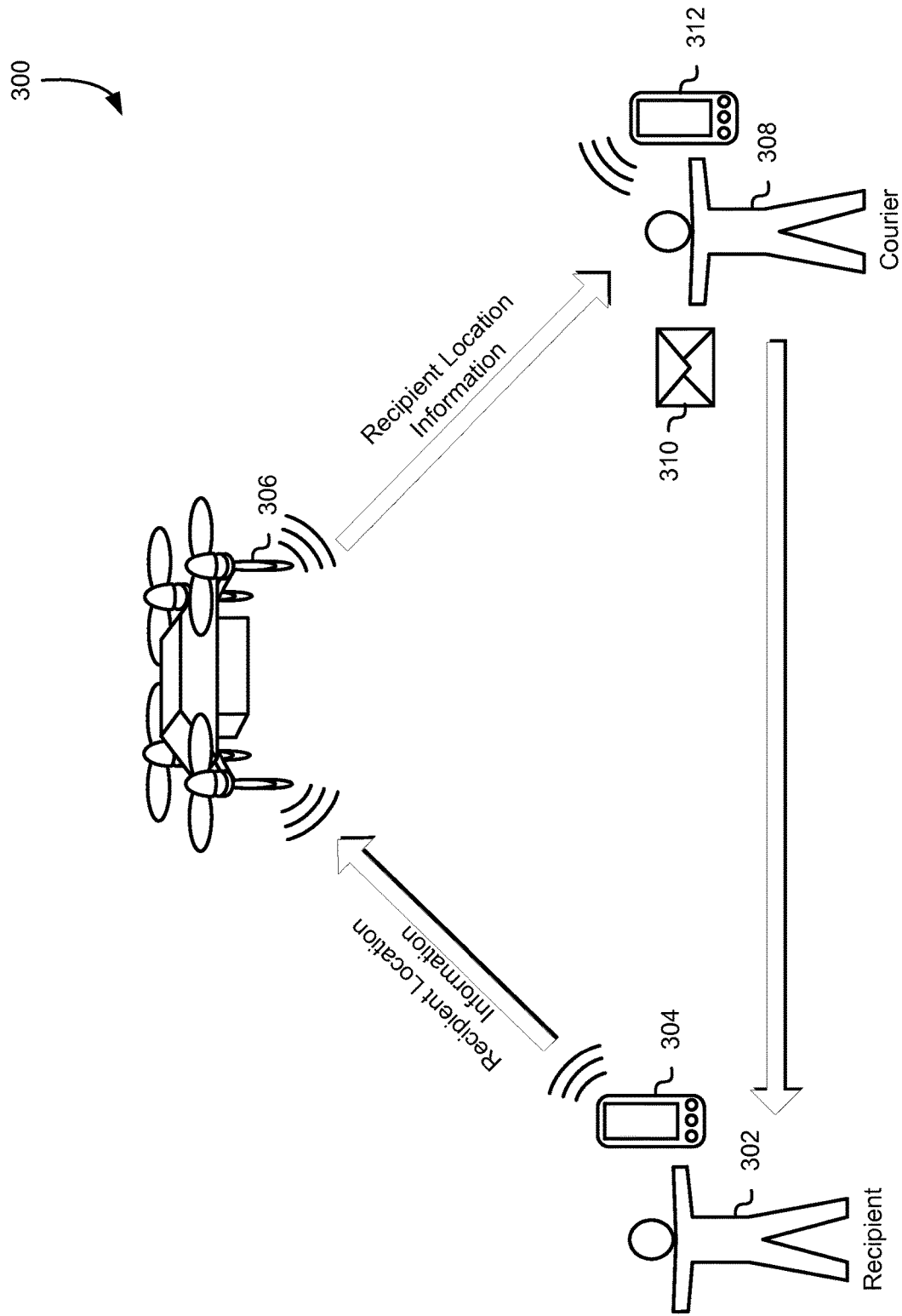
FIG. 3 shows an illustrative example of an environment in which location information for a recipient is obtained by an unmanned vehicle and provided to a courier in order to enable delivery to the recipient in accordance with at least one embodiment.

As noted above, the order fulfillment service may dispatch one or more unmanned vehicles, as well as a courier, to deliver one or more items to a customer or other intended recipient at a designated location. The courier may be provided with the one or more items to be delivered, as well as a mobile device usable to access a local communications network established by the one or more unmanned vehicles to obtain precise location information for the customer once obtained by the one or more unmanned vehicles. Accordingly, FIG. 3 shows an illustrative example of an environment 300 in which location information for a recipient 302 is obtained by an unmanned vehicle 306 and provided to a courier 308 in order to enable delivery to the recipient 302 in accordance with at least one embodiment.

In the environment 300, a customer 302 or other intended recipient may utilize its mobile device 304 to access a local communications network established by the one or more unmanned vehicles 306. For instance, as described above, the customer 302 or other intended recipient may utilize an SSID provided by the order fulfillment service to determine when the local communications network is available at its location to connect to the network. Alternatively, the customer 302 may provide credential information or cryptographic keys to the one or more unmanned vehicles 306 over the local communications network. This enables the one or more unmanned vehicles 306 to determine whether the customer 302 is authorized to transmit additional information to the one or more unmanned vehicles 306 through the local communications network. The one or more unmanned vehicles 306 may further broadcast an identifier for the local communications network (e.g., SSID, etc.) once the one or more unmanned vehicles 306 arrive at the designated location provided by the customer 302 to the order fulfillment service. Similar to the process described above in connection with FIG. 2, the customer 302 or other intended recipient may be required to provide credential information to the one or more unmanned vehicles 306 in order to join the mobile device 304 to the local communications network. The one or more unmanned vehicles 306 may utilize this provided credential information to determine whether the customer 302 or other intended recipient is authorized to join the local communications network and, if so, enable the mobile device 304 to be joined to the local communications network.

Once the customer 302 or other intended recipient has accessed the local communications network through use of its mobile device 304, the one or more unmanned vehicles 306 may transmit a request to the mobile device 304 to provide location information that may be used to determine the location of the mobile device 304 and, hence, the customer 302 or other intended recipient. For instance, the mobile device 304 may transmit one or more GPS coordinates to the one or more unmanned vehicles 306, which may be used to locate the mobile device 304. Alternatively, the mobile device 304 may transmit Cell-ID positioning information that may be utilized by the one or more unmanned vehicles 306 to determine the location of the mobile device 304. In some embodiments, if the customer 302 is unable to provide location information through the mobile device 304, the order fulfillment service can dispatch a number of unmanned vehicles 306 that, collectively, may be able to utilize signal triangulation to determine the location of the mobile device 304. For instance, if the order fulfillment service determines that it is unlikely that GPS coordinates, Cell-ID positioning location data, or other location data may be garnered from the mobile device 304 itself, the order fulfillment service may dispatch a number of unmanned vehicles 306 that may utilize the local communications network signal from the mobile device 304 to calculate, among the number of unmanned vehicles 306, the location of the mobile device 304. Alternatively, the order fulfillment service may configure an unmanned vehicle 306 to obtain signal data from the mobile device 304 at different locations around the provided estimated location of the customer 302 to determine, through triangulation, the precise location of the customer 302.

In an embodiment, the courier 308 delivering the one or more items 310 to the customer 304 or other intended recipient is also connected to the local communications network through use of a different mobile device 312. The order fulfillment service may dispatch the courier 308 to the location designated by the customer 304 and await arrival of the one or more unmanned vehicles 306 in order to join the local communications network using the courier's mobile device 312. Alternatively, the courier, through its mobile device 312, may maintain constant contact with the one or more unmanned vehicles 306 through the local communications network or an alternative communications method. Once the one or more unmanned vehicles 306 have determined the customer's or other intended recipient's location based at least in part on location information provided by the mobile device 304 or through signal triangulation of the mobile device's signal, the one or more unmanned vehicles 306 may provide location information to the courier 308 through its mobile device 312, which may be utilized by the courier 308 to travel to the determined customer 302 or other intended recipient location to deliver the one or more items 308.

When the courier 308 arrives at the customer's or other intended recipient's location, the courier 308 may withhold delivery of the one or more items 310 until the customer 302 or other intended recipient is authenticated by the courier 308 or through a device 312 carried by the courier (e.g., mobile device, computing device, card reader, etc.). The courier 308 may be provided with information from the order fulfillment service necessary to authenticate the customer 302 or other intended recipient. For instance, the courier 308 may be provided with an image of the customer 302 or other intended recipient, which the courier 308 may use to identify the customer 302 or other intended recipient at the location. Alternatively, the order fulfillment service may configure a device 312 provided to the courier 308 with expected credential information or other information that may be used to authenticate the customer 302 or other intended recipient. For example, this device 312 may be configured to determine whether credential information provided at the location corresponds to known credential information for the customer 302 or other intended recipient. If so, the device may be able to authenticate the customer 302 or other intended recipient and notify the courier 308 that delivery of the one or more items 310 may be performed. In some instances, the courier 308 may ask the customer 302 or other intended recipient for one or more sources of identification (e.g., driver's license, passport, etc.) to determine the identity of the customer 302 or other intended recipient and determine whether to complete delivery of the one or more items 310. For instance, if the one or more items 310 are subject to an age restriction (e.g., can only be provided to individuals over the age of 21, etc.), the courier 308 may evaluate these one or more sources of identification to determine whether the customer 302 or other intended recipient satisfies this age requirement. If so, the courier 308 may complete delivery of the one or more items 310.

Figure 4:
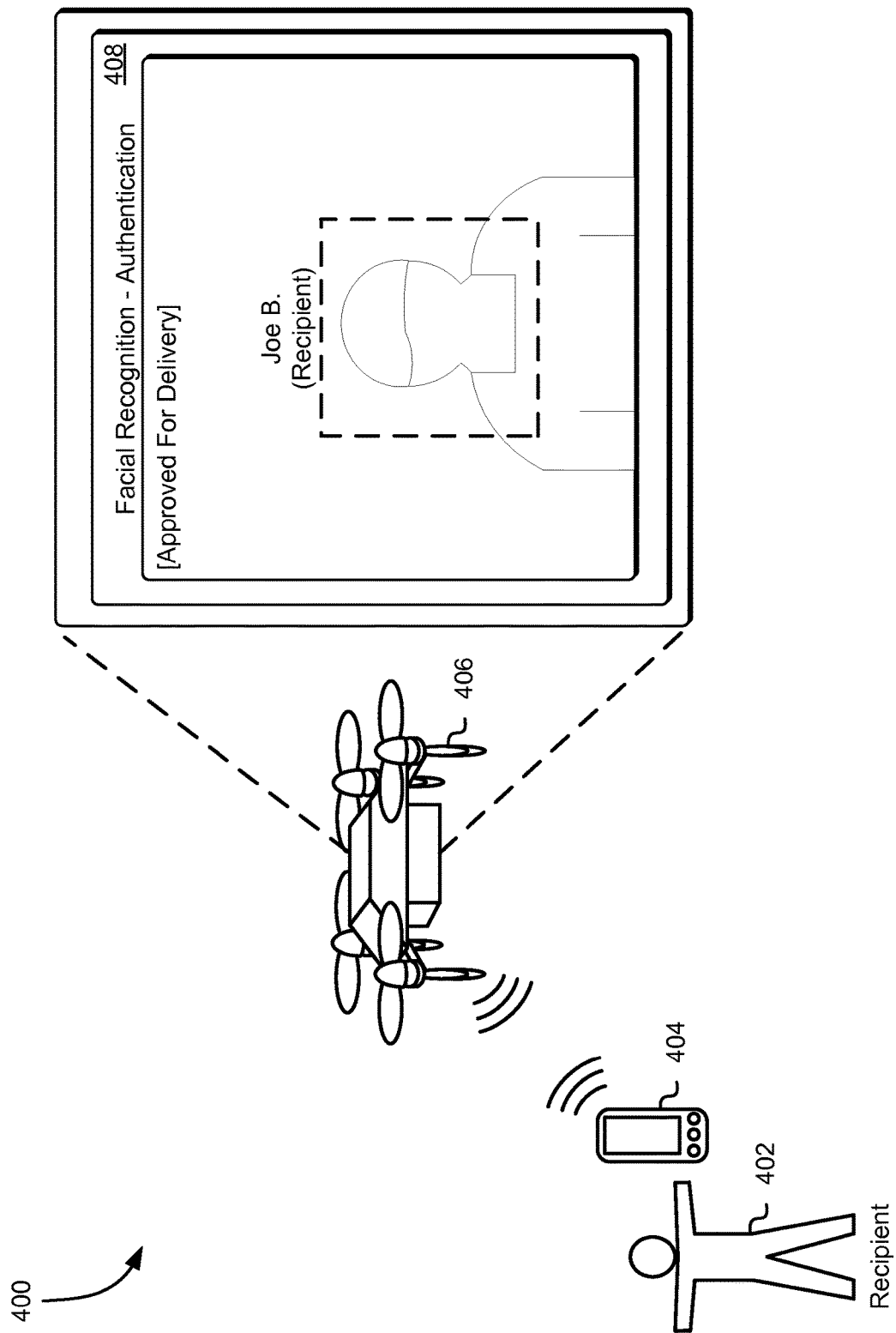
FIG. 4 shows an illustrative example of an environment in which an unmanned vehicle utilizes facial recognition techniques to authenticate a recipient and perform delivery of one or more items to the recipient in accordance with at least one embodiment.

As noted above, once the one or more unmanned vehicles have determined the location of the customer or other intended recipient, a subset of unmanned vehicles that may be carrying the one or more items for the customer or other intended recipient may travel to the determined location to deliver the one or more items. However, prior to delivery of the one or more items, the subset of unmanned vehicles may obtain authentication information from the customer or other intended recipient to determine whether the customer or other intended recipient can be authenticated, thereby enabling delivery of the one or more items. In some embodiments, an unmanned vehicle may utilize an attached camera or other scanning device to capture one or more images of the customer or other intended recipient at the location. This enables the unmanned vehicle to identify the customer or other intended recipient at the location and simultaneously authenticate the customer to ensure delivery of the one or more items to the intended recipient. Accordingly, FIG. 4 shows an illustrative example of an environment 400 in which an unmanned vehicle 406 utilizes facial recognition analyses 408 to authenticate a recipient 402 and perform delivery of one or more items to the recipient in accordance with at least one embodiment.

In the environment 400, one or more unmanned vehicles 406 have arrived at the location where the one or more unmanned vehicles 406 have determine that the customer's or other intended recipient's mobile device 404 is located. For instance, as described above in connection with FIG. 2, the one or more unmanned vehicles 406 may obtain location information from the mobile device 404 that may be used to determine the location of the mobile device 404 and, hence, the customer 402 or other intended recipient. Alternatively, the one or more unmanned vehicles 406 may utilize the signal between the mobile device 404 and the one or more unmanned vehicles 404 to calculate the location of the mobile device 404 through one or more triangulation calculations.

In an embodiment, when the unmanned vehicles 406 carrying the one or more items for delivery arrive at the determined location of the mobile device 404, the unmanned vehicles 406 will utilize one or more peripheral devices (e.g., cameras, infrared sensors, etc.) to scan the location to identify the intended customer 402 or other intended recipient. For instance, as illustrated in FIG. 4, an unmanned vehicle 406 may utilize obtain one or more images of individuals at the location and, utilizing facial recognition analyses 408, determine whether any of the individuals match a profile for the customer 402 or other intended recipient. For instance, when the customer 402 submits an order to the order fulfillment service, the customer 402 may be required to provide an image of the customer 402 or other intended recipient to the order fulfillment service, which may use one or more facial recognition analyses to generate one or more facial recognition vectors usable to identify the customer 402 or other intended recipient. When the unmanned vehicle 406 obtains one or more images of individuals at the location, the unmanned vehicle 406 may utilize the one or more facial recognition analyses 408 to convert the images into vectors. These vectors may be analyzed against the known facial recognition vectors for the customer 402 or other intended recipient to determine whether any of the individuals at the location match the customer's or other intended recipient's facial profile.

In addition to using the facial recognition analyses to identify the customer 402 or other intended recipient at the location, the unmanned vehicle 406 may utilize these facial recognition analyses to perform authentication of the customer 402 or other intended recipient. For instance, as illustrated in FIG. 4, the unmanned vehicle 406 may utilize the facial recognition analyses 408 to not only identify the customer 402 or other intended recipient but to also authenticate the customer 402 or other intended recipient as being the entity for whom the delivery is being made. In some embodiments, if the one or more unmanned vehicles 406 do not include any peripheral devices for scanning the location, the one or more unmanned vehicles 406 will transmit a request to the customer 402 or other intended recipient to transmit an image of the customer 402 or other intended recipient to the one or more unmanned vehicles 406 using the mobile device 404 at the location. For instance, once the one or more unmanned vehicles 406 obtain the image from the customer 402 or other intended recipient, the one or more unmanned vehicles 406 may utilize the facial recognition analyses 408 to identify and authenticate the customer 402 or other intended recipient. Further, as part of the authentication process, the one or more unmanned vehicles 406 may evaluate the metadata included with the provided image to ensure that the image was captured at the location and in response to the request from the one or more unmanned vehicles 406. This may prevent attempts to utilize surreptitious methods to obtain the one or more items.

Figure 5:
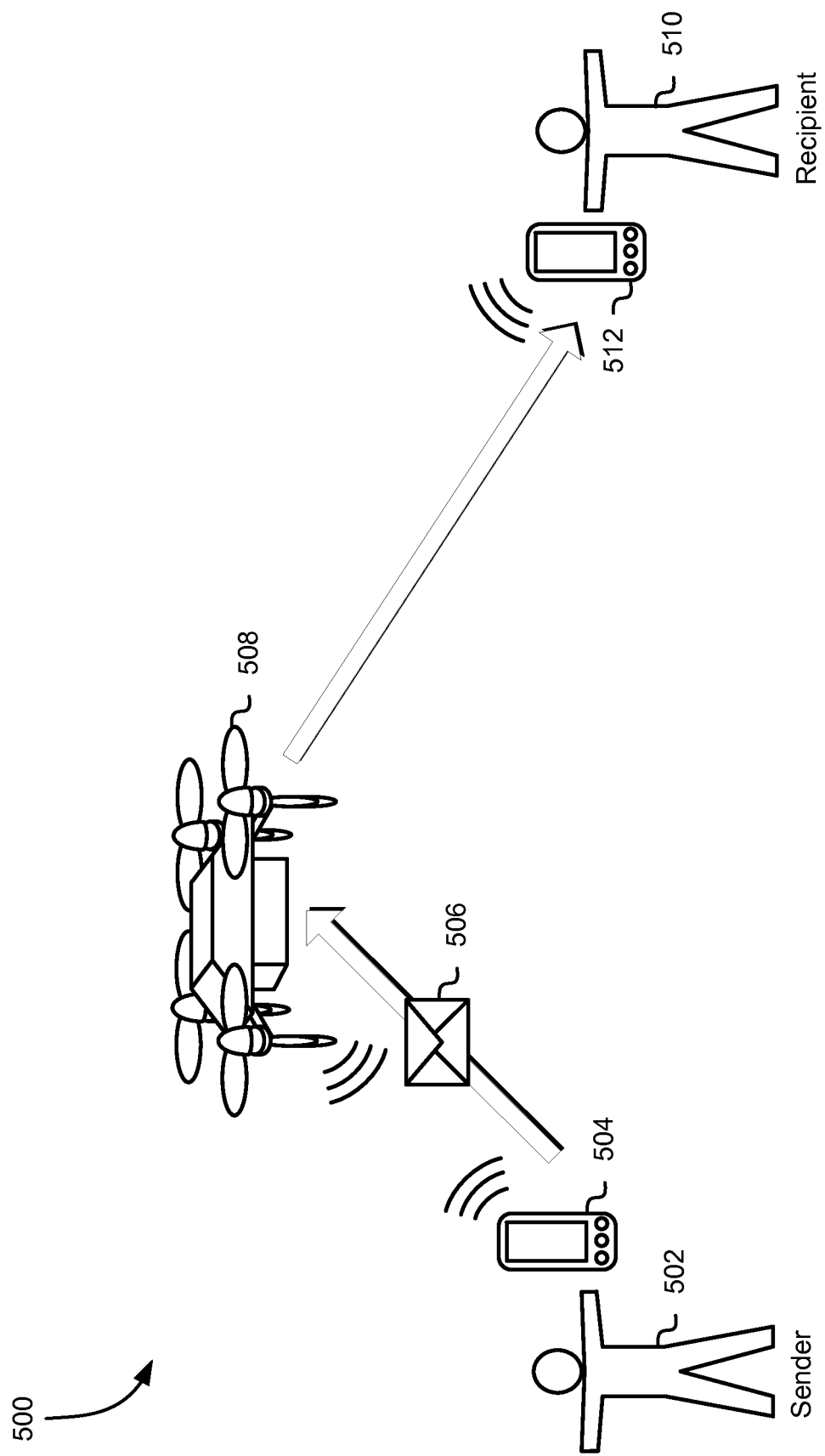
FIG. 5 shows an illustrative example of an environment in which an unmanned vehicle is utilized to obtain one or more items from a sender for delivery to a recipient in another location in accordance with at least one embodiment.

As noted above, a customer may transmit a request to an order fulfillment service to retrieve one or more items from the customer at the customer's location for delivery to an intended recipient in another location. Accordingly, FIG. 5 shows an illustrative example of an environment 500 in which an unmanned vehicle 508 is utilized to obtain one or more items 506 from a sender 502 (e.g., customer, vendor, etc.) for delivery to a recipient 510 in another location in accordance with at least one embodiment. In the environment 500, the customer 502 may transmit, through its mobile device 504, a request to an order fulfillment service to retrieve one or more items 506 for delivery to an intended recipient 510 at the recipient's location. The customer 502 may be a vendor associated with the order fulfillment service, which may use the order fulfillment service as a marketplace for the vendor's goods. Similar to the methods described above in connection with FIGS. 2 and 3, the order fulfillment service will dispatch one or more unmanned vehicles 508 to the customer's specified location and obtain location information or other data from the customer's mobile device 504 to identify the location of the customer 502. The one or more unmanned vehicles 506 dispatched to the customer's location may be selected based at least in part on the one or more items 506 to be retrieved from the customer's location. For instance, if the one or more items 506 are cumbersome (e.g., high weight, awkward shape, etc.), the order fulfillment service may dispatch one or more heavy-duty unmanned vehicles that may be capable of retrieving the one or more items 506. Thus, the order fulfillment service may require that the customer 502 provide an image of the one or more items 506 and/or other information about the one or more items 506 in order to determine which one or more unmanned vehicles 508 are dispatched to the customer's location. Alternatively, if the one or more unmanned vehicles 508 determine that receipt of the one or more items 506 cannot be performed using the one or more unmanned vehicles 508, the one or more unmanned vehicles 508 may transmit a notification to the order fulfillment service, which, in response, may dispatch one or more other unmanned vehicles capable of receiving the one or more items at the customer's location.

Once the one or more unmanned vehicles 508 arrive at the customer's location, the one or more unmanned vehicles 508 may obtain authentication information from the customer 502 to authenticate the customer 502 and determine whether the customer 502 is authorized to provide the one or more items 506 to be delivered to the one or more unmanned vehicles 508. In an embodiment, the customer 502 can specify, through its mobile device 504, the estimated location for the recipient 510 that is to receive the one or more items 506. For instance, the customer 502, through use of its mobile device 504, may transmit one or more instructions to the one or more unmanned vehicles 508 for delivery of the one or more items 506. These instructions may include the location of the recipient 510, the preferred delivery time of the one or more items 506 to the recipient 510, an image or other information that may be used to identify and authenticate the recipient 510 at the recipient's location, and the like. Based at least in part on the provided instructions and the characteristics of the one or more items 506, the one or more unmanned vehicles 508 may determine whether delivery of the one or more items 506 may be initiated upon departure from the customer's location or whether the one or more unmanned vehicles 508 are to return to the order fulfillment service in order to resupply for the delivery to the recipient 510 at the recipient's location. Additionally, the one or more unmanned vehicles 508 may determine whether stops at waystations along the route from the customer's location to the recipient's location is needed. For instance, the one or more unmanned vehicles 508 may utilize these waystations to recharge any fuel cells (e.g., batteries, gas tanks, etc.) or to provide the one or more items 506 to other unmanned vehicles or other delivery vehicles for delivery of the one or more items 506 to the intended recipient 510.

Similar to the methods described above, the one or more unmanned vehicles 508 may travel to the recipient's estimated location, as specified by the customer 502 and establish a local communications network. The customer 502 may have previously specified information usable by the one or more unmanned vehicles 508 to identify the recipient's mobile device 512. For instance, the one or more unmanned vehicles 508 may be configured to scan for the mobile device 512 signal at the designated location and, if identified, transmit a notification to the mobile device 512 indicating that a delivery has been scheduled for the recipient 510. Additionally, the one or more unmanned vehicles 508 may transmit a request to the recipient 510, through the recipient's mobile device 512, to join the local communications network established by the one or more unmanned vehicles 508 in order to obtain a precise location for the recipient 510. In some embodiments, the order fulfillment service will provide information usable by the recipient's mobile device 512 to access the local communications network to the recipient 510 when the recipient transmits a request to the order fulfillment service for delivery of the one or more items 506. For instance, if the order is to be fulfilled by obtaining the one or more items from the customer 502, the order fulfillment service may provide the SSID for the local communications network to the recipient 510 and configure the one or more unmanned vehicles to establish the local communications network using this SSID once the one or more unmanned vehicles 508 reach the recipient's estimated location.

Once the one or more unmanned vehicles 508 arrive at the specified location for the recipient 510, the one or more unmanned vehicles 508 may establish the local communications network and broadcast the SSID of the network. The recipient 510 may utilize its mobile device 512 to detect this SSID and join the local communications network in order to provide location information to the one or more unmanned vehicles 508 for delivery of the one or more items 506. As in the methods described above, the one or more unmanned vehicles carrying the one or more items 506 may travel to the determined recipient location to authenticate the recipient 510 and complete delivery of the one or more items 506 to the recipient 510 at the recipient's location.

Figure 6:
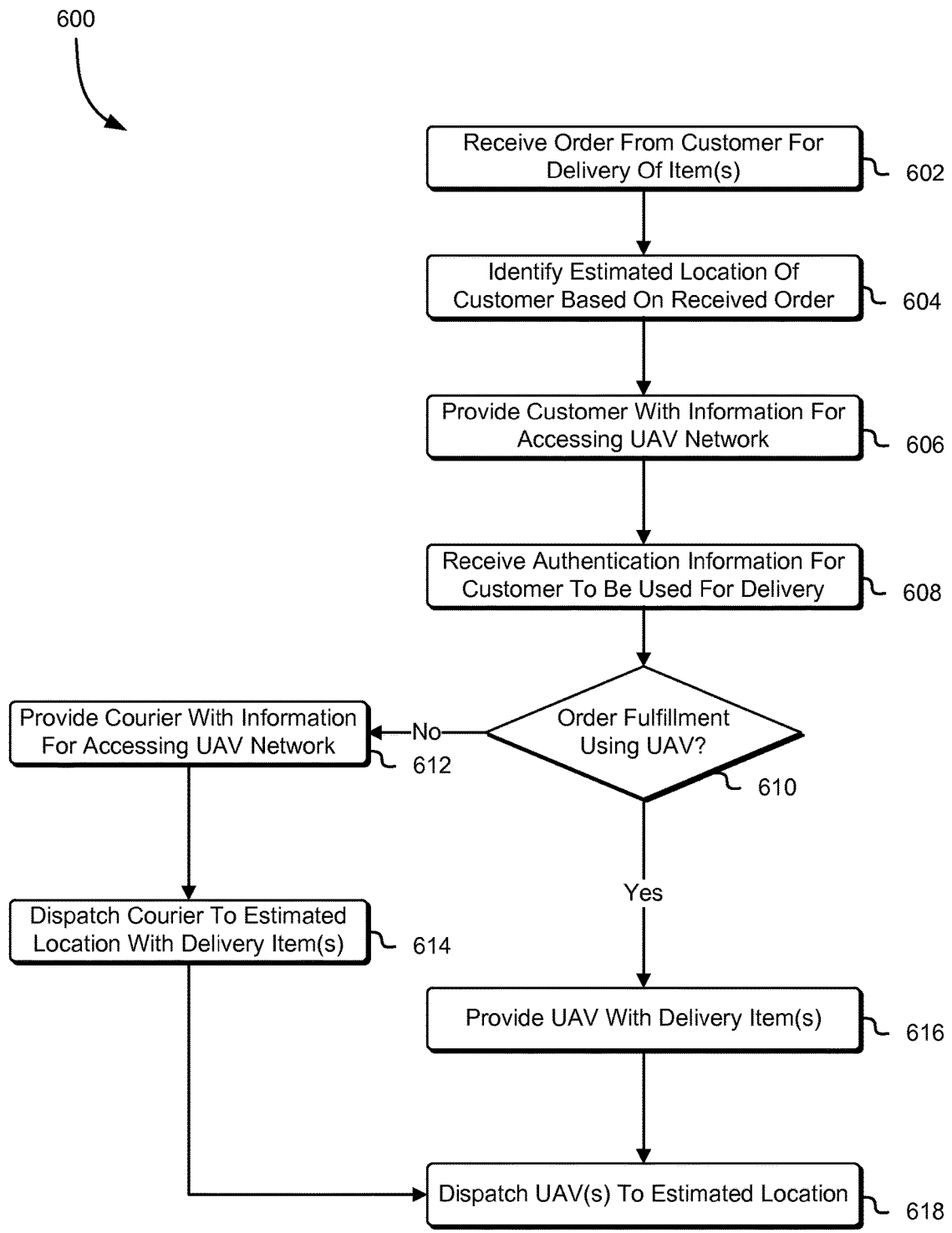
FIG. 6 shows an illustrative example of a process for dispatching one or more unmanned vehicles in response to an order received from a customer in accordance with at least one embodiment.

As noted above, an order fulfillment service may receive one or more requests from a customer to deliver one or more items to the customer or other intended recipient at a desired location. The order fulfillment service, in order to fulfill the customer's order, may dispatch one or more unmanned vehicles (e.g., unmanned aerial vehicles or "UAVs", etc.) to an estimated location specified by the customer, where the customer may provide more detailed location information usable by the one or more unmanned vehicles to locate the customer or other intended recipient and deliver the one or more items. Accordingly, FIG. 6 shows an illustrative example of a process 600 for dispatching one or more unmanned vehicles in response to an order received from a customer in accordance with at least one embodiment. The process 600 may be performed by aforementioned order fulfillment service, which may obtain requests from customers through each customer's mobile device or other computing device. Additionally, the order fulfillment service may also provide customers or other intended recipients with information usable for accessing the local communications network in order to provide location information or other information usable to locate the customer to the unmanned vehicles. Further, the order fulfillment service may configure the one or more unmanned vehicles to travel to the location specified by the customer, as well as establish the local communications network upon arriving at the location and authenticate the customer or other intended recipient.

The order fulfillment service may, at any time, receive 602 an order from a customer for delivery of one or more items. The one or more items may include physical items, such as merchandise, groceries, produce, clothing, and the like. In some embodiments, the one or more items can include digital content that may be provided to the customer upon delivery. For instance, if the customer is in a location that does not have significant network connectivity to one or more communications networks, such as the Internet, the order fulfillment service may fulfill a customer's order by dispatching one or more unmanned vehicles to the customer and establishing a network for customer use in obtaining the requested digital content. The order may specify the items to be delivered to the customer, the quantity of the one or more items to be delivered, a payment method for the one or more items, and the like.

The order from the customer may further include a desired location where the one or more items are to be delivered. For instance, the customer may provide a physical address of a location where the one or more items are to be delivered. In some embodiments, if the customer or other intended recipient is in a location where a physical address is not available, the customer may provide GPS coordinates or other information that may be used to determine an estimated location where the customer or other intended recipient will be located to receive the one or more items. If the customer has not supplied an address or other location information to the order fulfillment service, the order fulfillment service may transmit a request to the customer to provide location information for delivery of the one or more items. In this manner, the order fulfillment service may identify 604 an estimated location where the customer or other intended recipient will be located for delivery of the one or more items.

Once the order fulfillment service has identified the estimated location where the customer or other intended recipient will be located for delivery of the one or more items, the order fulfillment service may provide 606 the customer with information usable by the customer for accessing a local communications network to be established by the one or more unmanned vehicles to be dispatched to the estimated location. As noted above, this local communications network may be established at the estimated location to enable the customer or other intended recipient to access the network, provide additional location information to enable the one or more unmanned vehicles to locate the customer or other intended recipient, and to obtain authentication information usable to authenticate the customer or other intended recipient prior to delivery of the one or more items. The one or more unmanned vehicles may broadcast this SSID at the estimated location, enabling the customer or other intended recipient to verify that this is the local communications network that the customer should join in order to complete delivery of the one or more items. In an alternative embodiment, the order fulfillment service provides the information for accessing the local communications network to an application installed on the customer's mobile device. This application may automatically configure the mobile device to join the local communications network upon detection and to transmit authentication information to the one or more unmanned vehicles at the estimated location. The information usable by the customer for accessing the local communications network may further include one or more cryptographic keys of one or more cryptographic key pairs. The customer, through the mobile device, may provide these one or more cryptographic keys to the one or more unmanned vehicles upon detection of the local communications network. The one or more unmanned vehicles may utilize these one or more cryptographic keys from the customer to determine whether the customer is authorized to access the local communications network.

In order for delivery of the one or more items to be completed, the one or more unmanned vehicles or courier carrying the one or more items may be required to authenticate the customer or other intended recipient at the location. Thus, the order fulfillment service may transmit a request to the customer upon receipt of the order for authentication information usable to identify and authenticate the customer at the location. For instance, a customer may be required to provide an image of the customer or other intended recipient of the one or more items that may be used in one or more facial recognition analyses at the location. Alternatively, the customer may provide credential information for verification purposes at the location. For instance, at the location, the customer or other intended recipient may be prompted to provide the credential information originally provided with the order such that the customer or other intended recipient may be verified as being the intended recipient of the one or more items. If the one or more items are subject to one or more restrictions, such as an age restriction, the customer may be required to provide an image of a valid identification verifying that the customer is not subject to these one or more restrictions. This same identification may need to be provided at the location to ensure proper delivery of the one or more items. Thus, the order fulfillment service may receive 608 authentication information for the customer that is to be used to ensure correct delivery of the one or more items at the customer's location.

Once the order fulfillment service has obtained the order and the authentication information from the customer, the order fulfillment service may determine 610 whether the delivery of the one or more items is to be fulfilled using one or more unmanned vehicles or through use of a courier dispatched to the estimated location provided by the customer. For instance, if the one or more items to be delivered are cumbersome or exceed the weight limitations of an unmanned vehicle, the order fulfillment service may provide the one or more items to the courier for delivery. Alternatively, if the one or more items include digital content that may be streamed to the customer's mobile device at the location, the order fulfillment service may store the digital content within an unmanned vehicle's digital storage devices and dispatch the unmanned vehicle for delivery of the digital content. In some embodiments, the order fulfillment service may dispatch both couriers and unmanned vehicles if the order so requires.

If a courier is to be used for delivery of the one or more items, the order fulfillment service may provide 612 the courier with the SSID of the local communications network, or other information usable to access the local communications network to be established by the one or more unmanned vehicles that are to be used to establish the local communications network and determine the precise location of the customer or other intended recipient upon arriving at the estimated location provided by the customer. This enables the courier to maintain contact with the one or more unmanned vehicles and obtain the precise location of the customer or other intended recipient once the one or more unmanned vehicles have determined this precise location. The order fulfillment service may subsequently dispatch 614 the courier with the one or more items to the estimated location, where the courier may await further communications from the one or more unmanned vehicles to obtain the precise location of the customer or other intended recipient and complete delivery of the one or more items. Alternatively, if the order is to be fulfilled solely using one or more unmanned vehicles, the order fulfillment service may provide 616 at least one of the one or more unmanned vehicles with the one or more items to be delivered to the customer or other intended recipient.

Once the courier has been dispatched to the estimated location or the at least one unmanned vehicles has been provided with the one or more items for delivery, the order fulfillment service may dispatch 618 the one or more unmanned vehicles to the estimated location provided by the customer in the order. As will be described in greater detail below, the one or more unmanned vehicles may be configured to establish a local communications network upon arriving at the estimated location to enable the customer or other intended recipient to provide location information or signal information usable to precisely locate the customer or other intended recipient and enable delivery of the one or more items. Further, if a courier was dispatched to the estimated location, the one or more unmanned vehicles may provide this location information to the courier to enable the courier to proceed to the customer's or other intended recipient's location to deliver the one or more items.

Figure 7:
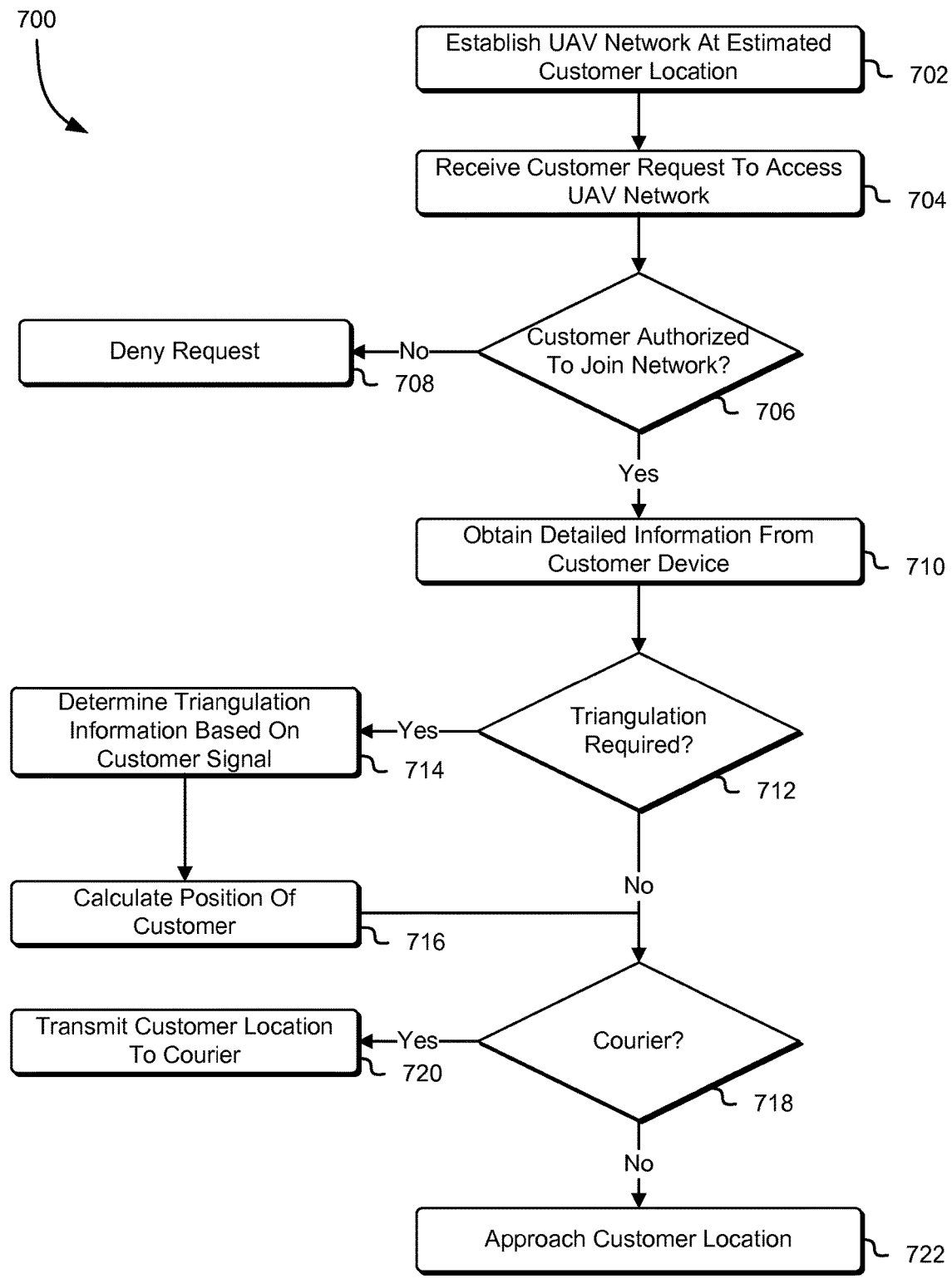
FIG. 7 shows an illustrative example of a process for establishing a local unmanned vehicle network for obtaining customer location information to enable delivery of one or more items to a customer in accordance with at least one embodiment.

As noted above, the order fulfillment service may dispatch one or more unmanned vehicles to a location specified by the customer where the customer or other intended recipient may be located for delivery of one or more items. In order to ensure that the one or more items are delivered to the correct recipient (e.g., customer or other intended recipient), the one or more unmanned vehicles may need to determine the precise location of the customer or other intended recipient and be able to authenticate the customer or other intended recipient at the precise location. Further, if a courier has been dispatched to the location to deliver the one or more items, the one or more unmanned vehicles may be required to provide the precise location of the customer or other intended recipient to the courier to enable the courier to deliver the one or more items at the precise location. Accordingly, FIG. 7 shows an illustrative example of a process 700 for establishing a local unmanned vehicle network for obtaining customer location information to enable delivery of one or more items to a customer in accordance with at least one embodiment. The process 700 may be performed by the aforementioned one or more unmanned vehicles, which may be configured to establish a local communications network for obtaining location information in order to determine the precise location where the customer or other intended recipient is located.

When the one or more unmanned vehicles arrive at the location specified by the customer within the order for the one or more items, the one or more unmanned vehicles may establish 702 a local communications network and enable the customer or other intended recipient to detect the presence of this network. The local communications network may be accessed using one or more wireless communications methods and standards, such as Wi-Fi, 4G Long-Term Evolution (LTE), 3G, and the like. The one or more unmanned vehicles may broadcast an SSID of the local communications network at the location. This may be the same SSID provided to the customer or other intended recipient as part of the information usable to access the local communications network provided to the customer or other intended recipient when the order was acknowledged by the order fulfillment service.

At any time, the one or more unmanned vehicles may receive 704 a request from the customer, other intended recipient, or other entity to access the local communications network. For instance, a customer or other intended recipient may utilize the provided SSID to identify the local communications network and transmit a request to join the network to provide more detailed location information and indicate the customer's or other intended recipient's presence. Alternatively, other entities may attempt to access this local communications network for its own purposes. Thus, once the one or more unmanned vehicles have received the request to access the local communications network, the one or more unmanned vehicles may determine 706 whether the entity is authorized to access the local communications network. For instance, in order to access this network, the entity may be required to provide credential information that may be used to determine whether the entity is authorized to access the network. This credential information may have been provided by the customer or other intended recipient to the order fulfillment service upon submitting the order for the one or more items. Alternatively, the order fulfillment service may configure the one or more unmanned vehicles to include expected credential information for the customer or other intended recipient. The customer or other intended recipient may be required to provide one or more cryptographic keys of a cryptographic key pair, which may have been provided by the order fulfillment service upon processing of the customer's order.

If the one or more unmanned vehicles are unable to determine whether the entity is authorized to access the local communications network or if the entity has not provided valid credential information, the one or more unmanned vehicles may deny 708 the entity's request to access the local communications network. Alternatively, if the one or more unmanned vehicles are able to determine that the customer or other intended recipient is authorized to access the local communications network, the one or more unmanned vehicles enables the customer or other intended recipient to access the network and provide detailed location information to the one or more unmanned vehicles. Thus, the one or more unmanned vehicles may obtain 710 detailed information from the customer's or other intended recipient's device (e.g., mobile device, computing device, etc.). The detailed information may include location information, such as GPS coordinates, Cell-ID positioning information, or other data usable to determine the precise location of the mobile device and, hence, the customer or other intended recipient. Alternatively, the detailed location information may include signal strength and the time required to receive a data packet from the mobile device. This information may be used to determine the location of the mobile device. If the mobile device is not able to provide detailed location information to the one or more unmanned vehicles, the mobile device may provide signal information that may be used for triangulation of the customer's location, as described below.

In an embodiment, a customer may utilize its mobile device to capture one or more image of the customer's surrounding environment, including landmarks, natural terrain features, and other elements of the surrounding environment. The customer may provide these one or more images to the one or more unmanned vehicles as detailed location information usable to determine the customer's precise location. The one or more unmanned vehicles may utilize one or more image processing analyses to determine the landmarks and other features of the customer's environment, which may be usable to determine the customer's precise location. For instance, the one or more unmanned vehicles may utilize cartographical data for the estimated location to identify any landmarks or natural terrain features and the distance of these features from the one or more unmanned vehicles. Based at least in part on the provided images, the one or more unmanned vehicles may calculate the customer's distance from these features. These values enable the one or more unmanned vehicle to calculate the distance from the one or more unmanned vehicles to the customer, using the terrain features as reference points.

Based at least in part on the detailed information provided, the one or more unmanned vehicles may determine 712 whether location triangulation is required to identify the precise location where the customer or other intended recipient is located. For instance, if the order fulfillment service has determined, based at least in part on the location specified by the customer, that triangulation may be required to determine the precise location where the customer or other intended recipient is located, the order fulfillment service may dispatch a number of unmanned vehicles capable of utilizing triangulation data to determine the location of the customer or other intended recipient. Thus, if triangulation data is necessary to determine the location of the customer or other intended recipient, the one or more unmanned vehicles may obtain 714 triangulation information from each other unmanned vehicle at the location specified by the customer in the request for the one or more items. For instance, the one or more unmanned vehicles may obtain signal strength data from the customer's or other intended recipient's mobile device. Further, the one or more unmanned vehicles may transmit a data packet to the mobile device and request a response to the data packet (e.g., ping test) to determine the latency in receiving a response from the mobile device. This information may be provided to each other unmanned vehicle. Similarly, each unmanned vehicle may obtain this information from each other unmanned vehicle. This enables each unmanned vehicle to calculate 716 the position of the customer or other intended recipient in relation to each unmanned vehicle. In an embodiment, a single unmanned vehicle may obtain signal strength data and/or perform a ping test at different locations around the estimated customer location. This enables the single unmanned vehicle to perform signal triangulation based at least in part on this information to calculate 716 the position of the customer.

Once the one or more unmanned vehicles have determined the precise location of the customer or other intended recipient, the one or more unmanned vehicles may determine 718 whether delivery of the one or more items is to be performed by a courier dispatched to the specified location or by the one or more unmanned vehicles. If the one or more items are to be delivered by a courier, the one or more unmanned vehicles may transmit 720 the customer's or other intended recipient's precise location information to the courier. This enables the courier to travel to the customer's or other intended recipient's location to deliver the one or more items. Alternatively, if the one or more unmanned vehicles are to perform deliver of the one or more items, the one or more unmanned vehicles carrying the one or more items for delivery may approach 722 the customer's or other intended recipient's location to initiate delivery of the one or more items.

Figure 8:
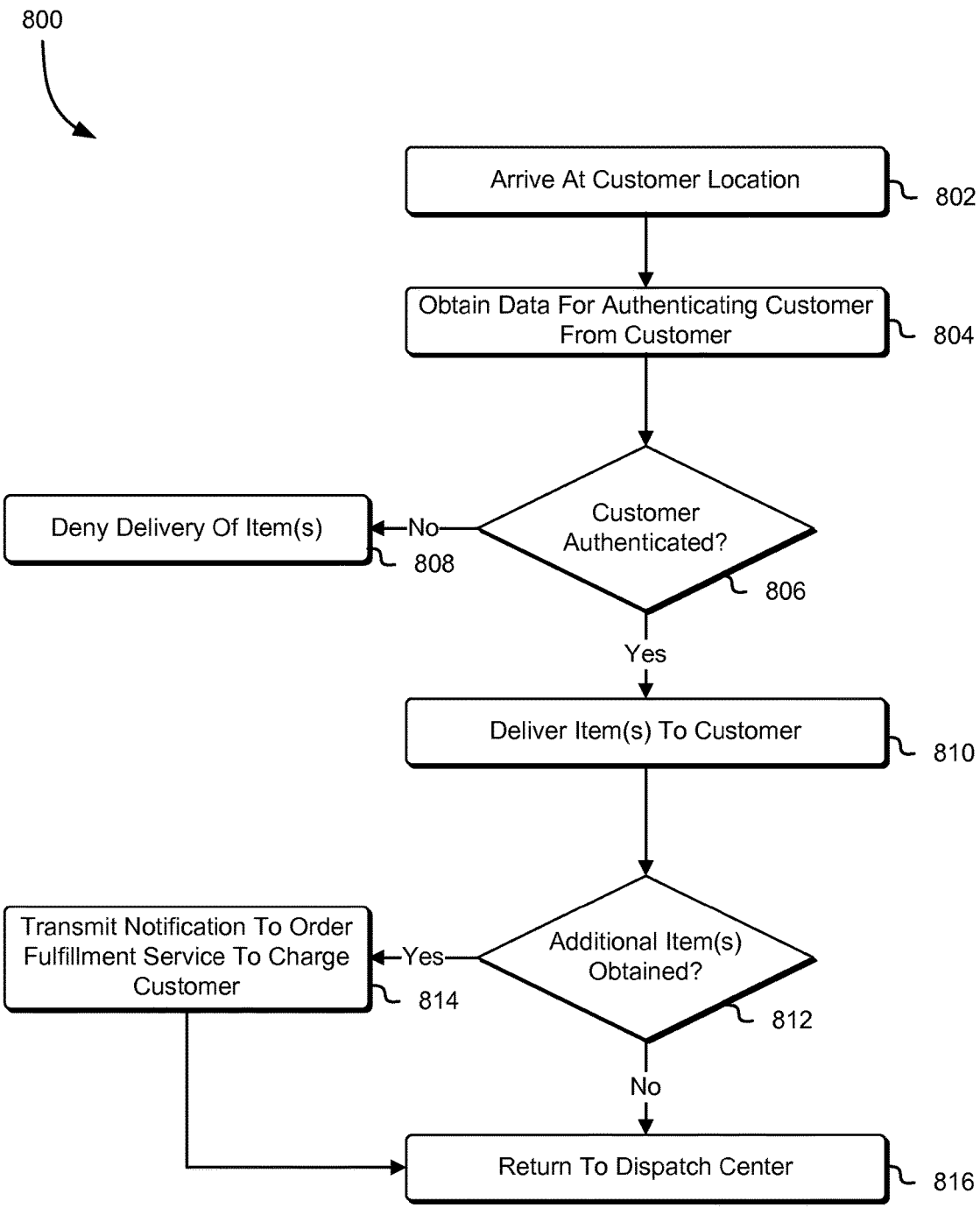
FIG. 8 shows an illustrative example of a process for delivering one or more items to a customer upon arriving at the customer's location in accordance with at least one embodiment.

As noted above, in order to ensure that delivery of the one or more items is completed successfully and to the correct customer or other intended recipient, the one or more unmanned vehicles may perform authentication of the customer or other intended recipient prior to delivering the one or more items to the customer or other intended recipient. Accordingly, FIG. 8 shows an illustrative example of a process 800 for delivering one or more items to a customer upon arriving at the customer's location in accordance with at least one embodiment. The process 800 may be performed by one or more unmanned vehicles performing delivery of one or more items to a customer or other intended recipient at a determined location. The one or more unmanned vehicles may be configured to obtain authentication information from customers or other intended recipients in order to identify and authenticate a customer or other intended recipient prior to delivery of the one or more items.

As described above in connection with FIG. 7, the one or more unmanned vehicles may determine the precise location of the customer or other intended recipient based at least in part on triangulation data calculated using signal data (e.g., signal strength, results of one or more ping tests, etc.) obtained from the customer's or other intended recipient's mobile device. Alternatively, the one or more unmanned vehicles may determine the precise location of the customer or other intended recipient based at least in part on GPS coordinates, Cell-ID positioning data, or other location data obtained from the customer's or other intended recipient's mobile device. Upon determining the precise location of the customer or other intended recipient, the one or more unmanned vehicles may arrive 802 at the determined location.

Once the one or more unmanned vehicles have arrived at the determined location, the one or more vehicles may obtain 804 data for authenticating the customer or other intended recipient from the customer or other intended recipient. For instance, when the one or more unmanned vehicles arrive at the determined location, the one or more unmanned vehicles may transmit a request to the customer's or other intended recipient's mobile device to provide credential information that may be used to authenticate the customer or other intended recipient. Alternatively, the one or more unmanned vehicles may prompt the customer or other intended recipient to provide an image of the customer or other intended recipient at the location. This enables the one or more unmanned vehicles to perform facial recognition analyses to determine whether the image of the customer or other intended recipient corresponds to a previously obtained image of the customer or other intended recipient provided to the order fulfillment service as part of the request for the one or more items. In some embodiments, the one or more unmanned vehicles may utilize one or more peripheral devices to scan the location for individuals that may be at the location. If the one or more unmanned vehicles identify one or more individuals at the location, the one or more unmanned vehicles may perform facial recognition analyses to determine whether any of the scanned individuals are the customer or other intended recipient. If so, this may serve as authentication of the customer or other intended recipient.

If the one or more unmanned vehicles are unable to authenticate the customer or other intended recipient at the location, the one or more unmanned vehicles may deny 808 delivery of the one or more items. However, if the customer or other intended recipient is successfully authenticated by the one or more unmanned vehicles, the one or more unmanned vehicles may deliver 810 the one or more items to the customer or other intended recipient. In an embodiment, the one or more unmanned vehicles will include, in addition to the one or more items for delivery, other items that may be purchased by the customer or other intended recipient when delivery of the one or more items are delivered. For instance, when a customer submit an order to the order fulfillment service for one or more items, the order fulfillment service may further load the one or more unmanned vehicles with other items that may appealing to the customer or other intended recipient upon delivery. Alternatively, the one or more unmanned vehicles may include other items that may be popular with other customers of the order fulfillment service. Thus, the one or more unmanned vehicles may determine 812 whether the customer or other intended recipient has obtained any additional items made available by the one or more unmanned vehicles.

If the one or more unmanned vehicles determine that the customer or other intended recipient has obtained any additional items, the one or more unmanned vehicles may transmit 814 a notification to the order fulfillment service to cause the service to charge the customer or other intended recipient for purchase of the additional items. In an alternative embodiment, the one or more unmanned vehicles include point-of-sale devices and/or peripherals that may be used to process transactions at the location. The customer or other intended recipient may provide payment information to the one or more unmanned vehicles through these point-of-sale devices, enabling the one or more unmanned vehicles to ensure that funds are available to enable the customer or other intended recipient to obtain the additional items. Once the one or more unmanned vehicles have completed delivery of the one or more items and, in some instances, the other additional items, the one or more unmanned vehicles may return 816 to the dispatch center of the order fulfillment service to await additional deliveries to other customers.

Figure 9:
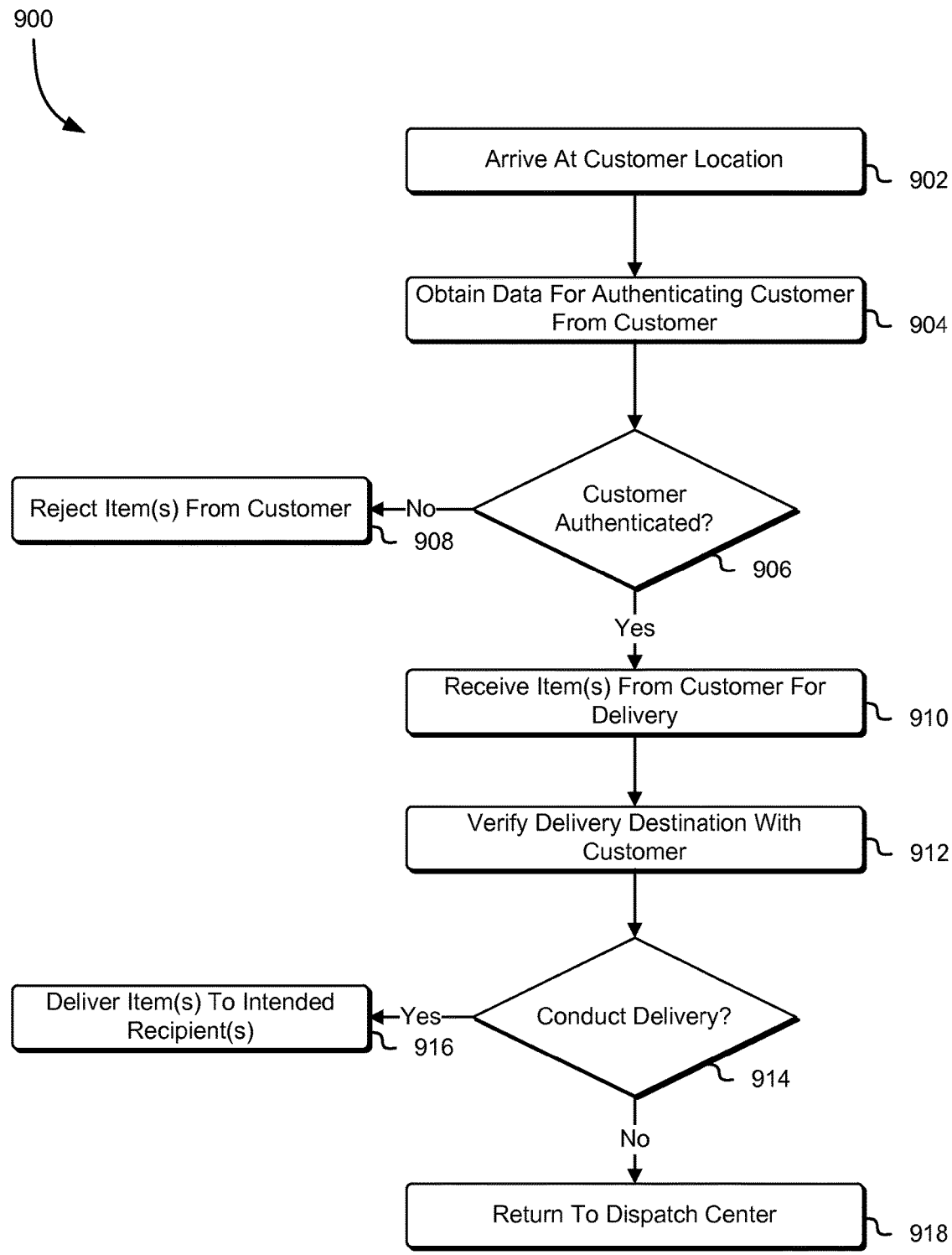
FIG. 9 shows an illustrative example of a process for obtaining one or more items from a customer upon arriving at the customer's location for delivery of the one or more items to a recipient in accordance with at least one embodiment.

As noted above, one or more unmanned vehicles may be dispatched to a customer's location based at least in part on a request by the customer to retrieve one or more items from the customer's location. The customer may specify that these one or more items are to be delivered to a particular recipient at the recipient's location. Alternatively, if the one or more items are to be returned to the order fulfillment service, the one or more unmanned vehicles may obtain the one or more items and return these items to the order fulfillment service. Accordingly, FIG. 9 shows an illustrative example of a process 900 for obtaining one or more items from a customer upon arriving at the customer's location for delivery of the one or more items to a recipient in accordance with at least one embodiment. The process 900 may be performed by the aforementioned one or more unmanned vehicles, which may be configured to receive information from the order fulfillment service to travel to the customer's specified location and enable the customer to provide the one or more items for delivery.

Similar to the process 800 described above in connection with FIG. 8, the one or more unmanned vehicles may arrive 902 at the customer's location and obtain 904 authentication data from the customer in order to authenticate the customer. As noted above, the customer may be a vendor associated with the order fulfillment service. The vendor may utilize the order fulfillment service as a marketplace for selling or providing its own goods to recipients and customers of the vendor. When the one or more unmanned vehicles arrive at the determined location, the one or more unmanned vehicles may transmit a request to the customer's mobile device to provide credential information that may be used to authenticate the customer. Alternatively, the one or more unmanned vehicles may prompt the customer to provide an image of the customer at the location. In some embodiments, the one or more unmanned vehicles may utilize one or more peripheral devices to scan the location for individuals that may be at the location. If the one or more unmanned vehicles identify one or more individuals at the location, the one or more unmanned vehicles may perform facial recognition analyses to determine whether any of the scanned individuals include the customer. If so, this may serve as authentication of the customer.

Based at least in part on the information garnered by the one or more unmanned vehicles, the one or more unmanned vehicles may determine 906 whether the customer has been authenticated successfully. If the one or more unmanned vehicles are unable to successfully authenticate the customer, the one or more unmanned vehicles may reject 908 the one or more items from the customer. For instance, the one or more unmanned vehicles may not make available the storage compartment of the one or more unmanned vehicles for the one or more items to be delivered to a recipient or returned to the order fulfillment service. Additionally, or alternatively, the one or more unmanned vehicles may depart from the customer's location and return to the order fulfillment service without the one or more items.

If the one or more unmanned vehicles are able to successfully authenticate the customer at the location, the one or more unmanned vehicles may receive 910 the one or more items from the customer for delivery to the intended recipient or to the order fulfillment service. For instance, the one or more unmanned vehicles may make available one or more storage compartments of the one or more unmanned vehicles and enable the customer to load the one or more items into these one or more storage compartments for delivery. Alternatively, the one or more unmanned vehicles may receive one or more commands from the customer, through its mobile device, to retrieve the one or more items from a nearby location. This may cause the one or more unmanned vehicles to go to the location where the one or more items may be located and utilize one or more devices to retrieve the one or more items for delivery.

In an embodiment, the one or more unmanned vehicles determine, at the customer location, whether the one or more unmanned vehicles are capable of receiving one or more items. For instance, the one or more unmanned vehicles may evaluate the one or more items to be received to determine whether the size or weight of these one or more items exceeds the allowable size/weight capacity for the one or more unmanned vehicles. If so, the one or more unmanned vehicles may transmit a notification to the order fulfillment service indicating that the one or more unmanned vehicles are unable to fulfill the customer request. This may cause the order fulfillment service to dispatch one or more unmanned vehicles capable of receiving the one or more items to the customer location. Alternatively, the order fulfillment service may dispatch a courier, which may obtain the one or more items at the location.

Prior to departing for delivery of the one or more items, the one or more unmanned vehicles may verify 912 the delivery destination for the one or more items. The one or more unmanned vehicles may transmit a notification to the customer, through the customer's mobile device, indicating the delivery destination previously provided to the order fulfillment service by the customer. Through the customer's mobile device, the customer may confirm that the specified destination is the delivery destination for the one or more items. Alternatively, if the customer wishes to deliver the one or more items to another location, the customer may utilize its mobile device to specify a new delivery destination and provide this new delivery destination to the one or more unmanned vehicles.

Once the one or more unmanned vehicles have verified the delivery destination for the one or more items, the one or more unmanned vehicles may determine 914 whether to conduct delivery of the one or more items to the intended recipient at the specified delivery destination. In order to determine whether to conduct delivery of the one or more items, the one or more unmanned vehicles may calculate the distance from the customer's location to the delivery destination, as well as the time required to reach the delivery destination and the remaining range of the one or more unmanned vehicles. If the one or more unmanned vehicles determine that the one or more unmanned vehicles do not have sufficient fuel/charge to reach the delivery destination, the one or more unmanned vehicles may return 918 to the dispatch center to refuel/recharge prior to delivery of the one or more items to the recipient at the delivery destination. Alternatively, if the one or more unmanned vehicles are capable of travelling to the delivery destination from the customer's location, the one or more unmanned vehicles may deliver 916 the one or more items to the intended recipient at the delivery destination.

Figure 10:
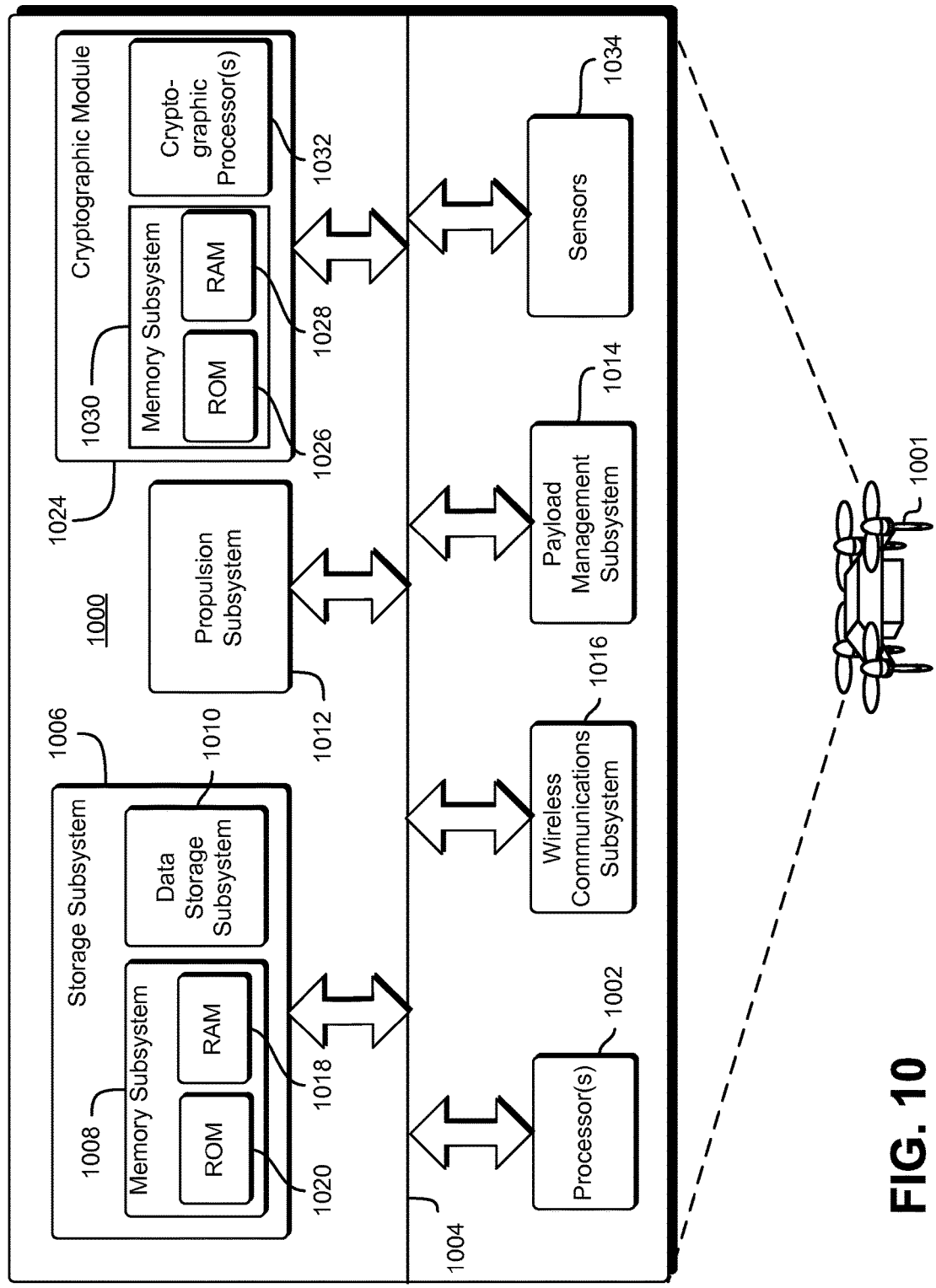
FIG. 10 shows an illustrative, simplified block diagram of an example on-board computer system of an unmanned vehicle that can be used to practice at least one embodiment.

FIG. 10 is an illustrative, simplified block diagram of an example on-board computer system 1000 of an unmanned vehicle 1001 that may be used to practice at least one embodiment of the present disclosure. In various embodiments, the computer system 1000 may be used to implement any of the systems illustrated herein and described above. As shown in FIG. 10, the on-board computer system 1000 may include one or more processors 1002 that may be configured to communicate with and are operatively coupled to a number of peripheral subsystems via a bus subsystem 1004. These peripheral subsystems may include a storage subsystem 1006, comprising a memory subsystem 1008 and a data storage subsystem 1010, a propulsion subsystem 1012, a payload management subsystem 1014, a wireless communication subsystem 1016, a cryptographic module 1024, comprising a memory subsystem 1030 and one or more cryptographic processors 1032, and a set of sensors 1034.

The bus subsystem 1004 may provide a mechanism for enabling the various components and subsystems of computer system 1000 to communicate with each other as intended. Although the bus subsystem 1004 is shown schematically as a single bus, alternative embodiments of the bus subsystem may utilize multiple busses.

The wireless communications subsystem 1016 may provide an interface to other computer systems and networks. The wireless communications subsystem 1016 may serve as an interface for receiving data from and transmitting data to other systems from the computer system 1000. For example, the network interface subsystem 1016 enables transmission of messages and other related information (e.g., digital signatures), such as messages indicating weather, hazards, commands, and/or other messages described herein. In an embodiment, the wireless communications subsystem 1016 uses the long-term evolution (LTE) standard to communicate with other wireless communications subsystems of other unmanned vehicles, and mobile devices or other computing devices utilized by customers and other intended recipients although the scope of the present disclosure includes wireless communications using any suitable standard and/or protocol. In some examples, the wireless communications subsystem 1016 communicates using the carrier sense multiple access with collision avoidance (CSMA/CA) protocol or another suitable protocol. The wireless communications subsystem 1016 may also facilitate the receipt and/or transmission of data on multiple networks, such as by transmitting some data directly to other unmanned aerial vehicles and transmitting other data through a cellular network.

The propulsion subsystem 1012 may include various components that propel the unmanned vehicle 1001 and that control the propulsion of the unmanned vehicle. For example, the propulsion subsystem 1012 may include a plurality of motors, each with a propeller, and a controller for the motors that controls the individual rotational velocity of each propeller so as to control the unmanned vehicle's speed, altitude, direction, pitch, roll, yaw, and, the flight dynamics of the unmanned vehicle. The propulsion subsystem 1012 may control other components (e.g., rudders, flaps, and other components that may affect the aerodynamics of the unmanned vehicle) if the unmanned vehicle is so equipped. While FIG. 10 shows a helicopter-style unmanned vehicle, other unmanned vehicles, such as noted above and, generally, any unmanned vehicle configured to travel on land, on sea, in sea, through air, and/or in space is considered as within the scope of the present disclosure and the specific mechanisms used for propulsion may vary in accordance with different embodiments.

The payload management subsystem 1014 may be a set of components of the computer system 1000 configured for the management of a payload of the unmanned vehicle 1001. For example, the payload management subsystem 1014 may control a cargo bay that opens and closes to drop a payload delivered by the unmanned vehicle 1001 or to enable customers to provide one or more items to the unmanned vehicle 1001 for delivery to other recipients. In some examples, an unmanned vehicle has multiple cargo bays that can be used to selectively deliver one of many payloads. Generally, the payload management subsystem 1014 may control one or more electrical and/or mechanical systems that enable the unmanned vehicle to release a payload from the control of the unmanned vehicle. The payload management subsystem 1014 may also include various mechanisms (e.g., hooks, magnets, claws, and the like) for retrieving payloads and loading into a cargo bay of the unmanned vehicle or otherwise for bringing a payload into the control of the unmanned vehicle. As such, the payload management subsystem 1014 may include a controller for one or more mechanisms (e.g., actuators or latches) that are used to open and close any cargo bays of the unmanned vehicle or otherwise control one or more payloads. Generally, the payload management system may perform other functions dependent on the specific configuration of the unmanned aerial vehicle 1001. For example, the payload management subsystem may be configured to deliver payloads in other ways in addition to or instead of opening cargo bays (e.g., by lowering a payload by a cable). The payload management subsystem 1014 may perform more advanced functions, such as shifting payloads to improve flight characteristics, picking up payloads, and, generally, performing other functions that the unmanned vehicle may be configured to perform.

The storage subsystem 1006 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, may be stored in the storage subsystem 1006. These application modules or instructions may be executed by the one or more processors 1002. The storage subsystem 1006 may additionally provide a repository for storing data used in accordance with the present disclosure. The storage subsystem 1006 may comprise a memory subsystem 1008 and a data (e.g., file/disk) storage subsystem 1010 (e.g., for storing messages received, logs, and/or other information).

The cryptographic module 1024, which may be a trusted platform module (TPM), includes a memory subsystem 1030, including a main random access memory (RAM) 1028 for storage of instructions and data during program execution and a read-only memory (ROM) 1026, in which fixed cryptographic information may be stored, such as a cryptographic key stored securely within the on-board computer system 1000 so as to be non-exportable (i.e., inaccessible through any call to the cryptographic module 1024). The cryptographic module 1024, in some embodiments, operates wholly or partly in compliance with Trusted Computing Group's TPM Main Specification level 2, Version 1.2, Revision 116, TPM Main Specification level 2, Version 1.2, Revision 103, and/or ISO/IEC 118810, which are incorporated herein by reference. The on-board computer system 1000 may also store cryptographic keys in RAM 1028 and/or processor registers for temporary cryptographic processing. The cryptographic information stored in memory may be used in combination with cryptographic information obtained via the network interface 1016 and/or one or more of the user interface input devices 1012. The one or more cryptographic processors may be used to perform cryptographic operations in the on-board computer system and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. The one or more cryptographic processors may further be configured to perform obfuscation and de-obfuscation algorithms described herein. Obfuscation and de-obfuscation algorithms may include various schemes for performing cryptographic operations on data including block ciphers, stream ciphers, and digital signature schemes. The cryptographic operations described herein may be implemented by software executing in the module, by hardware within the module, or a combination thereof. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one-way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure.

As noted above, in various embodiments of the present disclosure, cryptographic material (i.e., secret(s) such as cryptographic keys) is securely stored within the cryptographic module 1024. In some embodiments, the cryptographic module is implemented as or may contain a physically unclonable function (PUF), which is a function implemented in physical hardware to use one or more secrets that are based at least in part on physical characteristics of the PUF. As a result, any attempt to obtain a secret may require physical intrusion into the PUF and physical intrusion may alter the physical characteristics of the PUF, thereby destroying the secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a secret.

As illustrated in FIG. 10, the unmanned vehicle's on-board computer system 1000 may include a set of sensors 1014 that gather data utilized by the various components of the on-board computer system. For instance, the sensors 1014 may include an altimeter that is used by the propulsion subsystem 1012 for flying and related activities (e.g., taking off and landing). As another example, the sensors 1014 may include a gyroscope that is used by the propulsion subsystem 1012 to control pitch, roll, and/or yaw. An accelerometer may be used by the propulsion subsystem 1012 as part of its avionics logic. A global positioning system (GPS) sensor may be used by the propulsion subsystem 1012 to control flight according to routes and also by other subsystems, such as by the one or more processors 1002 for calculation of routes (e.g., by obtaining a current location and calculating an optimal route to a specified destination). A compass may be used by the propulsion subsystem 1012 to control direction. A set of proximity sensors (e.g., using acoustic proximity detectors) may be used by the propulsion subsystem 1012 for the purpose of obstacle avoidance and accurate navigation (e.g., during a delivery). Some sensors may be used to gather environmental data, such as audio, video, digital images, and the like. For instance, the sensors may be utilized to obtain one or more images of individuals at various locations in order to identify intended recipients of one or more items form the order fulfillment service. Other environmental data may be related to the weather and, accordingly, the sensors 1014 may include sensors that gather weather data, such as wind speed, barometric pressure, humidity, visibility, and the like. The sensors listed are examples and, generally, the specific sensors that are used on an unmanned aerial vehicle may vary in accordance with the tasks that the unmanned vehicle performs.

Figure 11:
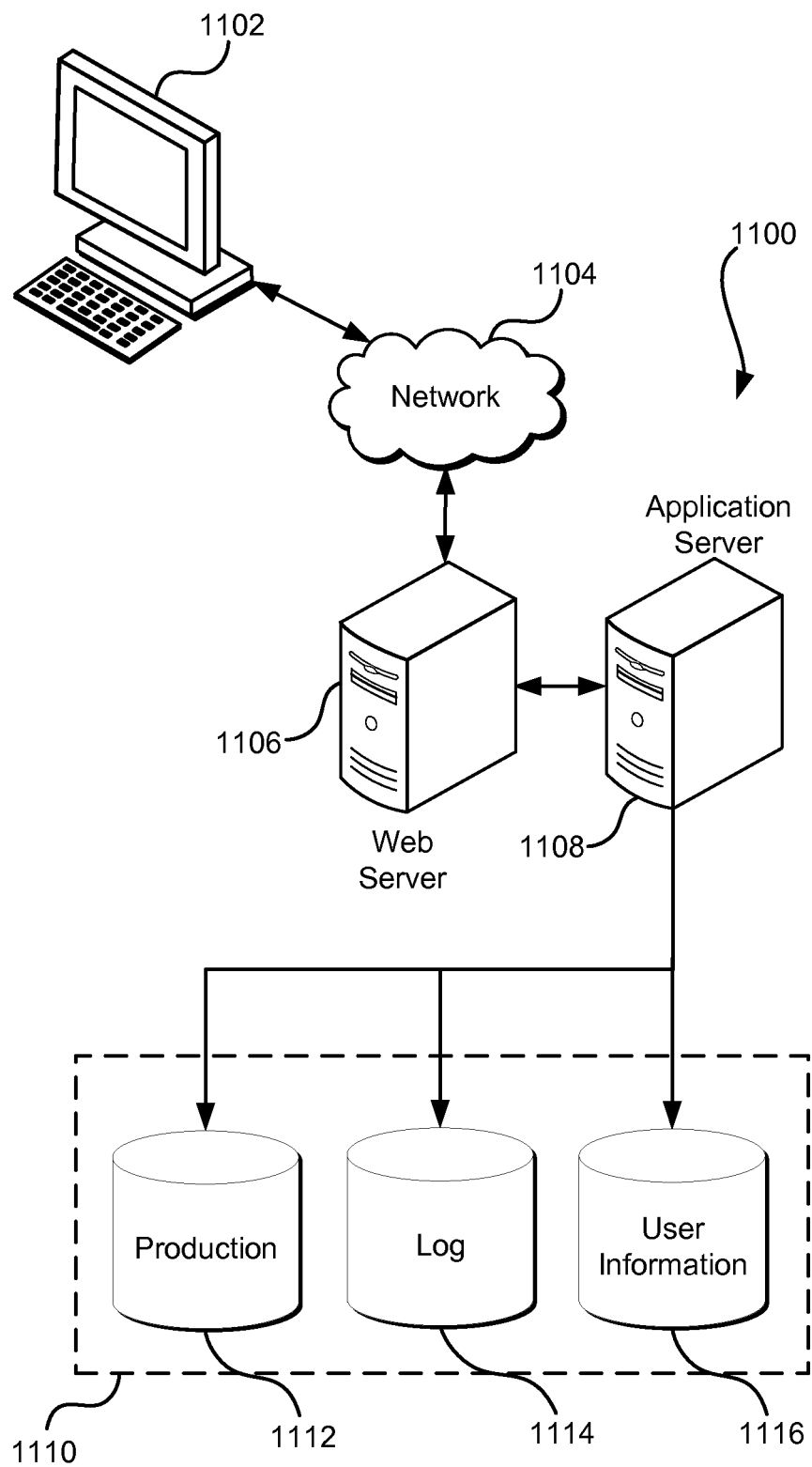
FIG. 11 shows an illustrative example of an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An unmanned vehicle, comprising:
   a propulsion subsystem configured to propel the unmanned vehicle between locations;
   a transceiver configured to receive and transmit messages; and
   an on-board computer system including:
      one or more processors; and
      memory that stores instructions that, when executed by the one or more processors, cause the on-board computer system to:
         obtain first location information usable to determine a first location;
         control at least the propulsion subsystem to travel to the first location;
         cause one or more additional propelled unmanned vehicles to communicate with the unmanned vehicle via a local communications network established by the unmanned vehicle;
         receive, from a user device, a request to join the local communications network provided by the unmanned vehicle and identified by a network identifier broadcast by the unmanned vehicle;
         obtain, over the local communications network, second location information usable to determine a second location; and
         use the second location information to enable performance of one or more operations at the second location.

2. The unmanned vehicle of claim 1, wherein the instructions further cause the on-board computer system to:
   establish the local communications network at the first location; and
   use information received over the local communications network to authenticate a device of a customer.

3. The unmanned vehicle of claim 2, wherein:
   the information received over the local communications network includes one or more images obtained through a device connected to the local communications network; and
   the instructions further cause the on-board computer system to use one or more facial recognition analyses to authenticate the customer.

4. The unmanned vehicle of claim 1, wherein:
the unmanned vehicle further comprises one or more storage compartments configured to carry a payload; and
the one or more operations include enabling a customer to access the storage compartment at the second location.

5. The unmanned vehicle of claim 4, wherein the instructions further cause the on-board computer system to:
receive, at the second location, one or more items for delivery to a recipient;
store the received one or more items in the one or more storage compartments;
obtain, over the local communications network, third location information usable to determine a third location where the recipient is located;
determine, based at least in part on characteristics of the received one or more items or the third location information, whether to travel to the third location; and
control at least the propulsion subsystem to travel to the third location to deliver the one or more items to the recipient based at least in part on the determination.

6. The unmanned vehicle of claim 4, wherein:
the one or more storage compartments include one or more items for delivery to the customer at the second location; and
the one or more operations include removing the one or more items from the one or more storage compartments at the second location to enable the customer to obtain the one or more items.

7. The unmanned vehicle of claim 1, wherein the instructions further cause the on-board computer system to transmit the second location information to a courier, the courier carrying one or more items for delivery and the second location information used by the courier to travel to the second location to deliver the one or more items.

8. The unmanned vehicle of claim 1, wherein the instructions further cause the on-board computer system to:
utilize the second location information to generate triangulation data usable to identify the second location, the triangulation data determined based on signal data obtained by the unmanned vehicle and the at least one additional unmanned vehicle that are connected to the local communications network; and
calculate the second location based at least in part on the generated triangulation data.

9. A non-transitory computer-readable storage medium having stored thereon executable instructions that, when executed by one or more processors of a computer system of an unmanned vehicle, cause the unmanned vehicle to at least:
obtain first location information associated with an order;
travel to a first destination corresponding to the obtained first location information;
establish a communication channel between the unmanned vehicle and one or more additional propelled unmanned vehicles via a local communications network provided by the unmanned vehicle at the first destination, the local communications network identifiable based on a network identifier;
receive, from another device via the local communications network, information usable to determine a second destination; and
perform, at the second destination, one or more operations involved with fulfillment of the order.

10. The non-transitory computer-readable storage medium of claim 9, wherein the instructions further cause the unmanned vehicle to transmit the information usable to determine the second destination to a courier to enable the courier to perform the one or more other operations involved with fulfil of the order at the second destination.

11. The non-transitory computer-readable storage medium of claim 9, wherein:
the order specifies third location information for delivering one or more items to a recipient at a third destination; and
the one or more operations involved with fulfillment of the order include:
obtaining one or more items at the second destination;
determining, based at least in part on characteristics of the one or more items or the third location information, whether to travel to the third destination; and
travelling to the third destination to deliver the one or more items based at least in part on the determination.

12. The non-transitory computer-readable storage medium of claim 9, wherein the instructions further cause the unmanned vehicle to:
establish, at the first destination, a local communications network;
obtain, from the other device and through the local communications network, authentication information of a customer; and
determine the one or more operations to be performed at the second destination based at least in part on the authentication information of the customer.

13. The non-transitory computer-readable storage medium of claim 9, wherein the instructions further cause the unmanned vehicle to:
obtain, at the second destination, one or more images of individuals at the second destination;
perform one or more facial recognition analyses on the obtained one or more images to determine whether a customer necessary for fulfillment of the order is present at the second destination; and
determine the one or more operations to be performed at the second destination based at least in part on the determination whether the customer necessary for fulfillment of the order is present.

14. The non-transitory computer-readable storage medium of claim 9, wherein:
the information usable to determine the second destination includes information indicative of signal latency from the other device; and
the instructions further cause the unmanned vehicle to:
obtain triangulation data based at least in part on the information indicative of signal latency from the other device; and
calculate a location of the second destination based at least in part on the triangulation data.

15. The non-transitory computer-readable storage medium of claim 9, wherein the instructions further cause the unmanned vehicle to:
determine if one or more items not associated with fulfillment of the order have been obtained from one or more storage compartments of the unmanned vehicle; and
generate a notification indicating that the one or more items not associated with fulfillment of the order have been obtained from the one or more storage compartments of the unmanned vehicle.

16. The non-transitory computer-readable storage medium of claim 9, wherein the one or more operations involved with fulfillment of the order include enabling the other device to access data stored within the unmanned vehicle.

* * * * *